United States Patent
Doya et al.

(10) Patent No.: US 9,527,058 B2
(45) Date of Patent: Dec. 27, 2016

(54) CONTINUOUS PROCESSING DEVICE

(71) Applicant: TSUKISHIMA KIKAI CO., LTD., Tokyo (JP)

(72) Inventors: Yo Doya, Tokyo (JP); Hidenori Goto, Tokyo (JP)

(73) Assignee: TSUKISHIMA KIKAI CO., LTD., Tokyo (JP)

( * ) Notice: Subject to any disclaimer, the term of this patent is extended or adjusted under 35 U.S.C. 154(b) by 0 days.

(21) Appl. No.: 14/423,045

(22) PCT Filed: Feb. 25, 2013

(86) PCT No.: PCT/JP2013/054740
§ 371 (c)(1),
(2) Date: Feb. 20, 2015

(87) PCT Pub. No.: WO2014/034158
PCT Pub. Date: Mar. 6, 2014

(65) Prior Publication Data
US 2015/0217264 A1 Aug. 6, 2015

(30) Foreign Application Priority Data
Aug. 28, 2012 (JP) .................................. 2012-187292

(51) Int. Cl.
*B01J 19/24* (2006.01)
*B01F 5/00* (2006.01)
(Continued)

(52) U.S. Cl.
CPC .............. *B01J 19/24* (2013.01); *B01F 3/0853* (2013.01); *B01F 3/0865* (2013.01); *B01F 5/0065* (2013.01); *B01F 5/0071* (2013.01); *B01F 5/10* (2013.01); *B01F 7/18* (2013.01); *B01F 13/1016* (2013.01); *B01F 13/1022* (2013.01);
(Continued)

(58) Field of Classification Search
CPC ... B01J 19/2415; B01J 19/2435; B01J 19/245; B01J 19/2405; B01J 19/242; B01J 19/24; B01F 5/0057; B01F 5/0065; B01F 5/0068; B01F 5/0071
See application file for complete search history.

(56) References Cited

U.S. PATENT DOCUMENTS 3,172,736 A * 3/1965 Gee et al. ............. B01F 3/0473
 134/22.1
3,703,502 A * 11/1972 Venderbos et al. ...... B01J 14/00
 528/499
(Continued)

FOREIGN PATENT DOCUMENTS

EP 0392545 A1 10/1990
JP 50-15466 B1 6/1975
(Continued)

*Primary Examiner* — Lessanework Seifu
(74) *Attorney, Agent, or Firm* — Muncy, Geissler, Olds & Lowe, P.C.

(57) ABSTRACT

To provide a processing device which is small but which can exhibits a sufficient processing amount and a uniform contact processing property. In the processing vessel 10, a liquid flow is set to a spiral flow, and in a contact processing field, the injection liquid A, B are injected at a center-side position with respect to an inner surface of the processing vessel so as to perform contact processing.

13 Claims, 27 Drawing Sheets

(51) Int. Cl.
  *B01F 5/10* (2006.01)
  *B01F 7/18* (2006.01)
  *B01F 13/10* (2006.01)
  *B01F 3/08* (2006.01)
  *C01G 53/00* (2006.01)
  *B01J 19/18* (2006.01)
  *B01F 15/06* (2006.01)

(52) U.S. Cl.
  CPC ......... *B01F 15/065* (2013.01); *B01J 19/1862* (2013.01); *B01J 19/242* (2013.01); *B01J 19/2405* (2013.01); *B01J 19/2435* (2013.01); *C01G 53/006* (2013.01); *B01J 2219/2401* (2013.01); *C01P 2004/03* (2013.01)

(56) References Cited

U.S. PATENT DOCUMENTS

| | | | |
|---|---|---|---|
| 3,794,299 A * | 2/1974 | Wagner | B01F 5/0057 210/198.1 |
| 4,831,971 A * | 5/1989 | Ott | B01F 5/0057 123/25 A |
| 5,116,488 A | 5/1992 | Torregrossa | |
| 5,462,639 A * | 10/1995 | Matthews | B01J 8/14 210/512.1 |
| 5,827,350 A | 10/1998 | Magill et al. | |
| 6,943,223 B1 * | 9/2005 | Bleijenberg | B01F 13/0266 521/56 |
| 2007/0036689 A1 * | 2/2007 | Mercuri | B01J 19/0013 422/129 |
| 2015/0188133 A1 | 7/2015 | Doya et al. | |

FOREIGN PATENT DOCUMENTS

| | | |
|---|---|---|
| JP | 57-71628 A | 5/1982 |
| JP | 62-270406 A | 11/1987 |
| JP | 63-258624 A | 10/1988 |
| JP | H04-0240288 A | 8/1992 |
| JP | H0735245 B2 | 4/1995 |
| JP | 9-500822 A | 1/1997 |
| JP | 2003-081628 A | 3/2003 |
| JP | 2006-239596 A | 9/2006 |
| JP | 2008168263 A | 7/2008 |
| JP | 2009-195882 A | 9/2009 |
| JP | 2011-116608 A | 6/2011 |
| WO | WO 2013190861 A1 | 12/2013 |

* cited by examiner

FIG. 25   SEM IMAGES WHEN 20 HOURS HAVE PASSED
(a)
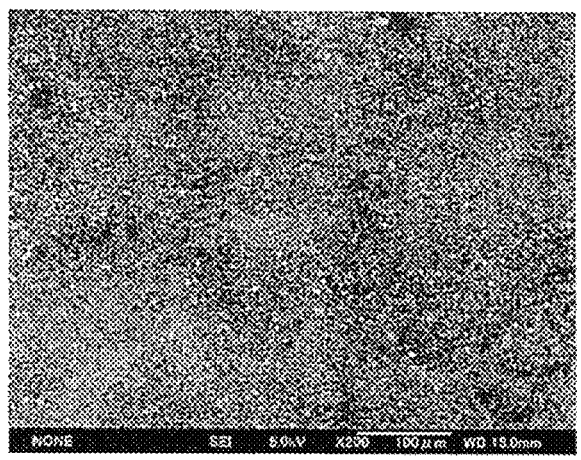
(b)
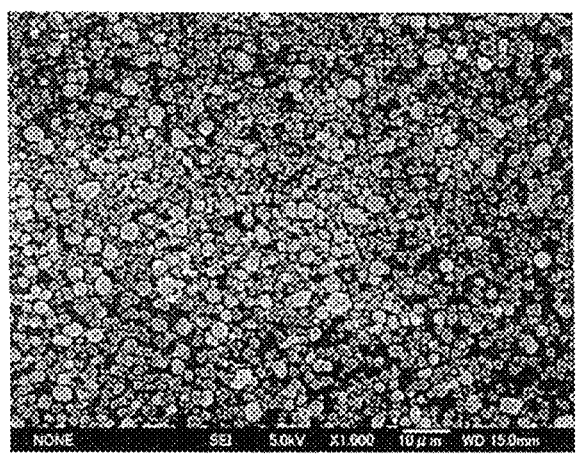
(c)
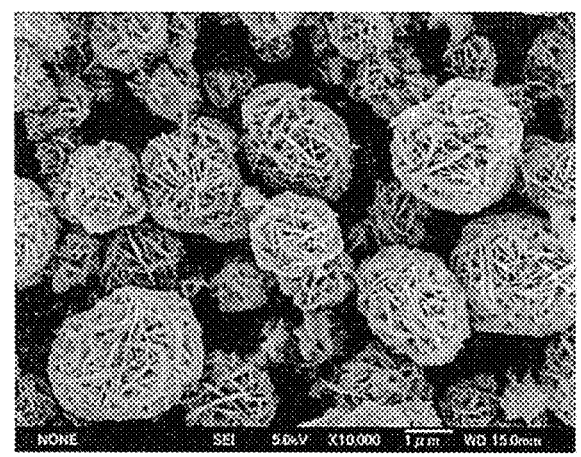

FIG. 27
SEM IMAGES WHEN 15 HOURS HAVE PASSED
(a)
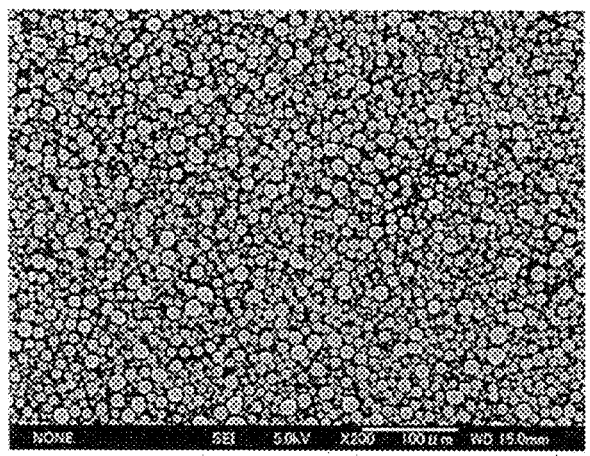
(b)
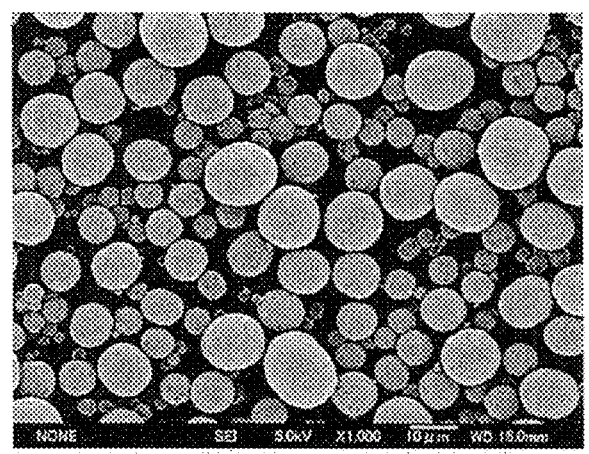
(c)
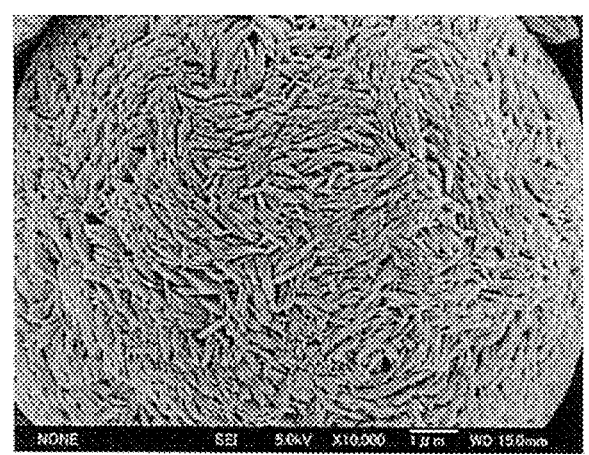

CONTINUOUS PROCESSING DEVICE

TECHNICAL FIELD

The present invention relates to a continuous processing device that circulates a processed liquid, and especially relates to a continuous reaction device accompanying a reaction.

BACKGROUND ART

There are lots of operations of obtaining products or intermediate products through industrial processing, such as reactions including a liquid-liquid reaction, a gas-liquid reaction, and a catalyst reaction, as well as generation of particles by crystallization.

Typical processing is illustrated in FIG. 23 in which component A, component B or component C are fed into a stirred contact processing reactor 1 and are stirred with a stirring blade 3 having a stirring motor 2 so as to facilitate the reactions of the components. Then, a product liquid is discharged through a discharge outlet 5 at appropriate timing and after that, crystallization particles are obtained by filtration, washing and drying for example. The reference numeral 4 is designated as a baffle 4.

In this processing, a large contact processing reactor 1 is necessary and stirring is performed with the stirring blade 3 for uniform reactions and processing. However, there is a limit beyond which the expectation for the uniform reactions cannot go.

Meanwhile batch processing cannot be applied with high efficiency where the components are fed into the contact processing reactor 1 and stirred afterward. On the other hand, a continuous production system can be applied with high efficiency where the components are continuously fed while they are stirred. However, in the continuous production system, it is difficult to set conditions for contact processing (ex. control of the amount of fed components with respect to lapse of time) so that homogenous products cannot be always efficiently obtained.

As an attempt to solve the above problems, a micro reactor having a flow path of 1 mm or less has been proposed. However, in such micro reactor, there are problems such as a small processing amount, failure of continuous production due to blockage of the flow path, resulting in small number of practical examples on an industrial scale.

A technology of allowing components to be in contact with other components when the components are moved in a cyclone system is disclosed in Patent Literature 1.

CITATION LIST

Patent Literature

Patent Literature 1: JP 4-240288 A

SUMMARY OF INVENTION

Technical Problem

However, this technology has been developed not for reactions and processing but for separation of components.

In a technical field of contact processing in e.g., chemical industry, a reaction device is highly required which is small but which can exhibit a sufficient processing amount and a uniform contact processing property.

Accordingly, a main object of the present invention is to provide a reaction device which is small but which can exhibits a sufficient processing amount and a uniform contact processing property.

Solution to Problem

The present invention that solves the problems is as follows.

[Invention Described in Claim 1]

A continuous processing device including: a processing vessel; an injecting unit for injecting an injection liquid into the processing vessel; and a circulating unit for extracting a processed liquid from another end portion of the processing vessel and returning at least a part of the extracted processed liquid to a one end portion of the processing vessel, the device comprising the processing vessel, in which a liquid flow is set to a spiral flow, and into which the injection liquid is injected at a center-side position with respect to an inner surface thereof.

[Invention Described in Claim 2]

The continuous processing device according to claim 1, wherein a field of contact processing in the processing vessel is positioned at a center-side region of the spiral flow generated in the processing vessel with respect to the inner surface of the processing vessel so as to perform contact processing of the injection liquid in the field of the contact processing.

(Operation and Effect)

In the field of the contact processing that exhibits the spiral flow as the liquid flow, flow in a swirl portion in the center or in an inner peripheral portion in the vicinity of a void portion in the center, like a whirlwind, has large turbulence with high effect of mass transfer and stirring mixing that influences the reaction. This portion becomes a field of rapid diffusion of the injection liquid containing an injection gas or reactant, which enables a uniform reaction.

Further, an outer peripheral portion of the spiral flow is in contact with the wall surface of the flow path, and thus the outer peripheral spiral flow becomes a supplier of the reactant so as to moderate rapid fluctuation of substances/ heat. The outer peripheral spiral flow functions as a barrier against the reactant of the injected substances (liquid, gas, solid). Therefore, adhesion of the reactant to the inner surface of the flow path may be prevented so as to enable a stable operation for a long time.

Initially, the inventors attempted to develop a tube reactor, as a device which is small but which can exhibits a sufficient processing amount. However, the inventors have found out that, in some sort of reaction processing material system, fine shower (primary nuclei) adheres to a wall surface of a flow path, and afterward, a crystal grows from the primary nuclei and block the flow, and it becomes difficult to perform a long-time stable operation.

In order to handle these cases, a measure can be considered as follows, reaction paths are arranged in parallel, and if a blockage has occurred, the reaction path is switched to the other reaction path, and circulation is performed while the reaction path in which the blockage has occurred is cleaned. However, even in such short switching, fluctuation in particle diameters due to a discontinuous operation in the field of the contact processing should be avoided, and thus a mechanism is required, which is tolerable for a stable operation for a long time.

Then, it has been found out that the above problems can be solved according to the present invention, by setting the liquid flow in the processing vessel to the spiral flow, and by injecting the injection liquid to be processed at the center-side position with respect to the inner surface of the processing vessel so as to perform the contact processing.

[Invention Described in Claim 3]

The continuous processing device according to claim 1, wherein the spiral flow is generated by introducing a returned liquid of the processed liquid from the circulating unit into the processing vessel.

[Invention Described in Claim 4]

The continuous processing device according to claim 3, wherein the spiral flow is generated by introducing the returned liquid of the processed liquid into the processing vessel along an inner peripheral surface of the processing vessel.

(Operation and Effect)

In generating the field of the contact processing, various types of liquid including the injection liquid containing an inorganic substance to be injected are injected in a tangent direction to an inner wall surface of the vessel for example so as to set the liquid flow in the processing vessel to the spiral flow for the field of the contact processing.

When the spiral flow is generated by circulating the liquid through the processing vessel, and by introducing the returned liquid of the circulated liquid into the processing vessel, the outer peripheral portion of the spiral flow forms a cylinder-shaped part having a certain thickness in an inner surface of the processing vessel. As a result, a phenomenon is caused, where the cylinder-shaped part functions as a barrier against a reaction with a newly injected injection liquid so that temperature fluctuation caused due to heat absorption/heat generation by the reaction can be reduced as well as adhesion of the reactant to the inner surface of the flow path can be prevented.

[Invention Described in Claim 5]

The continuous processing device according to claim 1, wherein an inner surface of the processing vessel is tapered from the one end portion to the other end portion and an inflow position of a returned liquid is the one end portion of the processing vessel in a longitudinal direction.

(Operation and Effect)

The processing vessel may have a cylindrical shape with a uniform radius of an inner space. However, the processing vessel having the inner surface that is tapered from the one end portion to the other end portion in the longitudinal direction is favorable for generating the spiral flow.

In the processing vessel, it is desirable to secure a certain long space along the longitudinal direction in order to have the enough length of the field of the contact processing for generating the spiral flow. Therefore, it is preferable that the liquid is introduced into the processing vessel from the one end portion of the processing vessel in the longitudinal direction while the liquid is extracted from the other end portion in the longitudinal direction.

[Invention Described in Claim 6]

The continuous processing device according to claim 1, wherein an outflow position of an outflow liquid after contact processing is the other end portion of the processing vessel.

(Operation and Effect)

Such configuration is suitable for forming a circulation path, and the length of a reaction section can be provided without a complicated mechanism in a reaction part. As a result, an effect of a decrease in circulation energy is achieved.

[Invention Described in Claim 7]

The continuous processing device according to claim 6, wherein the outflow position of the outflow liquid after the contact processing is positioned at the one end-side with respect to the injection position of the injection liquid.

(Operation and Effect)

By discharging the outflow liquid after the contact processing from the one end portion-side with respect to the injection portion of the injection liquid, the outflow liquid can be discharged without any influence from the field for generating the spiral flow.

[Invention Described in Claim 8]

The continuous processing device according to claim 1, wherein the outflow position of an outflow liquid after contact processing is positioned between a circulation pump included in the circulating unit and the processing vessel.

That is to say, in this embodiment, the outflow position is positioned between the delivery-side of the circulation pump and the processing vessel.

(Operation and Effect)

The outflow liquid can be discharged without influence from the field for generating the spiral flow.

[Invention Described in Claim 9]

The continuous processing device according to claim 1, wherein the processing vessels that provide fields of contact processing are arranged in series.

(Operation and Effect)

In order to increase the processing amount, it is desirable to arrange the processing vessels in series.

This arrangement in the series enables to increase the amount of the injection liquid by an amount corresponding to the number of stages without increasing the amount of the returned liquid of the circulated liquid. Accordingly, the amount of production can be increased and the internal volume of facilities can be decreased considering the amount of production. As a result, it is possible to save a space and to reduce cost for the facilities. Here, the expression "the internal volume of facilities can be decreased considering the amount of production" means as follows. An increased volume is caused only by the processing vessels and pipes connecting the vessels while the circulation pump and flow path have constant volume, because any additional circulation pump or any additional flow path is not necessary. Therefore, the entire volume of the facilities can be decreased considering the amount of production. Further, since "the internal volume of facilities can be decreased," there is another effect that a retention time of the reactant in the vessel can be decreased, resulting in that the retention time can be controlled for decreasing the particle diameters.

[Invention Described in Claim 10]

The continuous processing device according to claim 1, wherein the processing vessels that provide fields of contact processing are arranged in parallel.

(Operation and Effect)

The processing vessels can be arranged in parallel when the processing amount is increased or the like.

Especially, when the same processing vessels are arranged in parallel, the processing amount, which is based on uniform contact processing performed in each vessel, can be increased. On the other hand, when the processing vessels are arranged in series, a pressure gradient is generated over a flow direction. Thus, if a uniform reaction process is required in each vessel, the parallel arrangement is favorable.

[Invention Described in Claim 11]

The continuous processing device according to claim 1, wherein the injection liquid is injected toward the field of the contact processing in a downstream direction of the spiral flow of the liquid.

(Operation and Effect)

As described after, the injection liquid may be injected in the upstream direction of the spiral flow of the liquid toward the field of the contact processing. However, when the liquid is injected in the downstream direction of the spiral flow of the liquid, the amount of adhered materials to the inner surface can be decreased.

[Invention Described in Claim 12]

The continuous processing device according to claim 1, wherein the injection liquid is injected toward the field of the contact processing in an upstream direction of the spiral flow of the liquid.

(Operation and Effect)

Even if the injection liquid is injected in the upstream direction of the spiral flow of the liquid toward the field of the contact processing, a case may be caused where the amount of adhered materials to the inner surface is practically acceptable.

[Invention Described in Claim 13]

The continuous processing device according to claim 2, comprising the processing vessel through which the liquid is circulated, wherein midway in the circulating, an external reactor is provided, which has a stirring blade and a different structure from that of the processing vessel, a part of a final contact processing liquid is extracted outside from the processing vessel so as to be sent to the external reactor where the sent liquid is processed, and the processed liquid is returned to the processing vessel.

(Operation and Effect)

In this processing device, the contact processed liquid extracted from the processing vessel is processed again in the external processing reactor. Therefore, it is possible to have long retention time and to perform reliable contact processing.

[Invention Described in Claim 14]

The continuous processing device according to claim 2, comprising the processing vessel through which the liquid is circulated, wherein midway in the circulating, two external tanks are provided in series, a downstream-side external tank is an external sedimentation separation tank, to which the injection liquid is not injected, and in which sedimentation and separation are performed, and only a group of fine particles in an upper portion of the external sedimentation separation tank is returned to the processing vessel.

(Operation and Effect)

In a case where the processing includes crystallization, since crystals in the returned liquid function as seed crystals, the particle size distribution in the processing vessel can be adjusted. An upstream-side external tank can be used as a buffer tank or a reactor.

[Invention Described in Claim 15]

The continuous processing device according to claim 2, comprising the processing vessel through which the liquid is circulated, wherein midway in the circulating, an external sedimentation separation tank, to which the injection liquid is not injected, and in which solid-liquid separation, separation of particles according to size or gas separation is performed, and only a group of fine particles in an upper portion of the external sedimentation separation tank or only a gas separated liquid is returned to the processing vessel.

(Operation and Effect)

Since crystals in the returned liquid function as seed crystals, the particle size distribution in the processing vessel can be adjusted.

When the gas separated liquid is returned, an effect can be obtained where the gas, which is a reaction product in the liquid, can be reduced previously. Accordingly, the concentration of the reaction product in the circulation liquid is decreased, and thus the reaction can be more easily advanced in a forward direction, and an effect of improvement of the reaction speed can be expected.

[Invention Described in Claim 16]

The continuous processing device according to claim 1, wherein a space is formed in a main body block and the processing vessel is formed in the space.

(Operation and Effect)

The processing vessel can be made of a metal. Further, the processing vessel can be formed in the main body block, which is made of e.g. transparent plastic by means of cutting work or the like.

[Invention Described in Claim 17]

The continuous processing device according to claim 1, wherein a space is formed in a main body block and plural processing vessels are formed in series in the space.

[Invention Described in Claim 18]

The continuous processing device according to claim 1, wherein a space is formed in a main body block and plural processing vessels are formed in parallel in the space.

[Invention Described in Claim 19]

The continuous processing device according to claim 1, wherein a space is formed in a main body block and the processing vessel, an extraction path through which a processed liquid is extracted, and a return path through which the processed liquid is returned, are respectively formed in the space.

[Invention Described in Claim 20]

The continuous processing device according to claim 16, wherein the main body block is made of a transparent or semitransparent material.

(Operation and Effect)

As an operation status, a producing condition of the reactant and an abnormal condition such as scaling and blocking can be visually observed.

[Invention Described in Claim 21]

The continuous processing device according to claim 1, wherein plural unitary devices are arranged and the unitary device essentially comprises the processing vessel, the injecting unit, and the circulating unit.

[Invention Described in Claim 22]

The continuous processing device according to claim 1, wherein the injecting unit is configured so that the injection liquid is injected while the spiral flow is generated in the processing vessel.

(Operation and Effect)

The contact efficiency of the injection liquid to a mother liquid becomes favorable, and the mass transfer is further facilitated, and a mixing effect is obtained. Further, stable injection of the injection liquid becomes possible in the reaction vessel with pressure fluctuation.

[Invention Described in Claim 23]

The continuous processing device according to claim 1, wherein the injecting unit is configured to inject the injection liquid into the processing vessel through a check valve.

(Operation and Effect)

Even if there is pressure fluctuation in the processing vessel, the injection liquid can be injected without influence from the pressure fluctuation.

[Invention Described in Claim 24]

The continuous processing device according to claim 1, wherein midway in a circulating path, a heating unit or cooling unit for the processed liquid is included.

(Operation and Effect)

By heating or cooling the liquid in circulating, it becomes possible to maintain a constant temperature in the processing vessel so as to enable stable contact.

[Invention Described in Claim 25]

The continuous processing device according to claim 1, wherein a ratio of an injection port diameter D1 of a main flow that becomes the spiral flow to a diameter D2 of a field of contact processing for generating the spiral flow is expressed by D2/D1=2.5 to 10.

Here, the shape of the injection port may be not only a circular section, but also a square section or the like. Further, in a case of the square section (b×h), the lateral length b (the height h) is referred as D1.

[Invention Described in Claim 26]

The continuous processing device according to claim 1, wherein a ratio of a port diameter D3 of an extraction portion to a diameter D2 of a field of contact processing for generating the spiral flow is expressed by D2/D3=0.5 to 10.

[Invention Described in Claim 27]

The continuous processing device according to claim 1, wherein a ratio of a length H in a flow path direction to a diameter D2 of a field of contact processing for generating the spiral flow is expressed by H/D2=1 to 10.

Advantageous Effects of Invention

According to the present invention, the large processing amount as well as a stable contact processing property can be achieved with a small processing device.

BRIEF DESCRIPTION OF DRAWINGS

FIG. 16(a) is a plan view and FIG. 16(b) is a front view.
FIG. 21(a) is a plan view and FIG. 21(b) is a front view.
FIGS. 25(a) to 25(c) are SEM photographs of particles of Example 1.
FIGS. 27(a) to 27(c) are SEM photographs of particles of Comparative Example 1.

DESCRIPTION OF EMBODIMENTS

Figure 1:
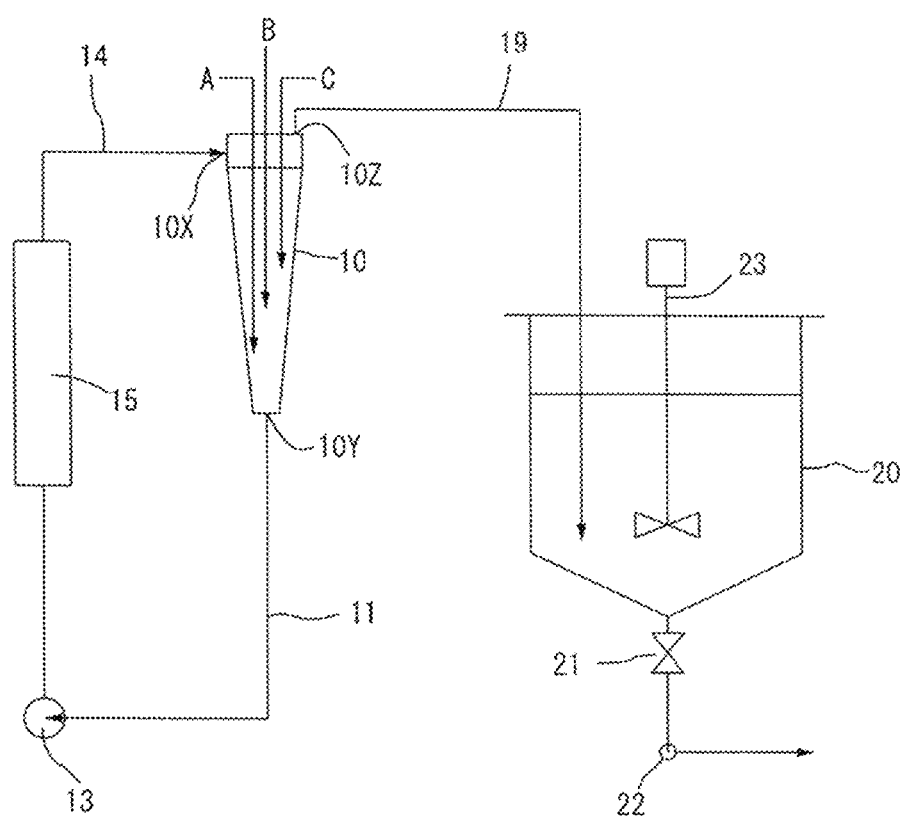
FIG. 1 is a schematic diagram of a first example of the present invention.

Next, embodiments for implementing the present invention will be described.

As described below, the present invention can be applied widely. However, if various examples are comprehensively described, the description may become a cause of confusion. Therefore, a device example will be described, and then other application examples will be described later.

A typical example of the present invention is a continuous processing device for obtaining metal particles used for manufacturing a cathode active material for a lithium ion battery, for example. As specific examples, the present invention is intended for manufacturing of agglomerated particles using transition metals such as Ni, Co, and Mn.

The present invention may be intended for other metals than the above-described transition metals and for other inorganic substances, because a method where an injection liquid containing an inorganic substance to be added is injected at a center-side position with respect to an inner surface of a processing vessel so as to perform contact processing in a field for generating spiral flow in the processing vessel can be widely and typically applied.

FIGS. 1 to 4 illustrate the first example of the present invention. A liquid flow in a processing vessel 10 is set to a spiral flow, an injection liquid containing an inorganic substance to be added is injected at a center-side position with respect to an inner surface of the processing vessel 10 in a field (conceptually illustrated with the reference sign Q in FIG. 4) in the processing vessel 10 for performing contact processing.

In the illustrated example, as the injection liquid containing the inorganic substances to be added, the liquid A, the liquid B, and the liquid C are injected. Although not illustrated, a gas D (an inert gas such as a nitrogen gas or a carbon dioxide gas) can be injected together in parallel.

Further, in the first example of the present invention, the injection liquid containing the inorganic substances to be added is injected toward the field of contact processing in the downstream direction of the spiral flow of the liquid.

In the drawing, the processing vessel 10 is vertically arranged, but the processing vessel 10 may be horizontally arranged because there is no effect on the flow in principle.

In the illustrated processing vessel 10, a liquid is circulated through circulation paths 11, 14 (an extraction path 11, a return path 14) with a circulation pump 13 and a returned liquid of the circulated liquid is introduced into the processing vessel 10 so as to generate the spiral flow. Reference numeral 15 is designated as a temperature regulator 15 used in heating or cooling the liquid.

Figure 3:
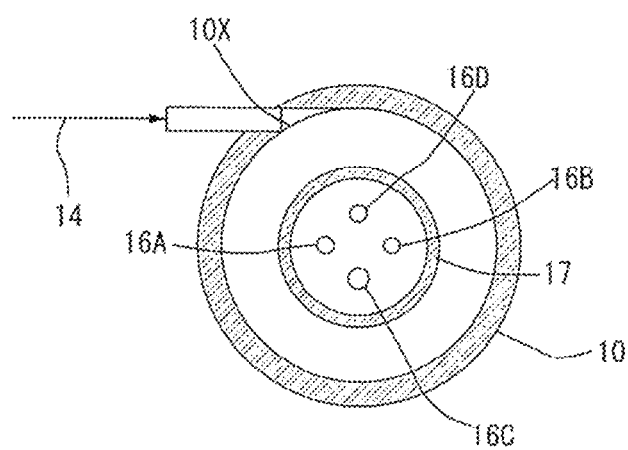
FIG. 3 is a traverse cross-sectional view of an upper end portion of a processing vessel.
Figure 4:
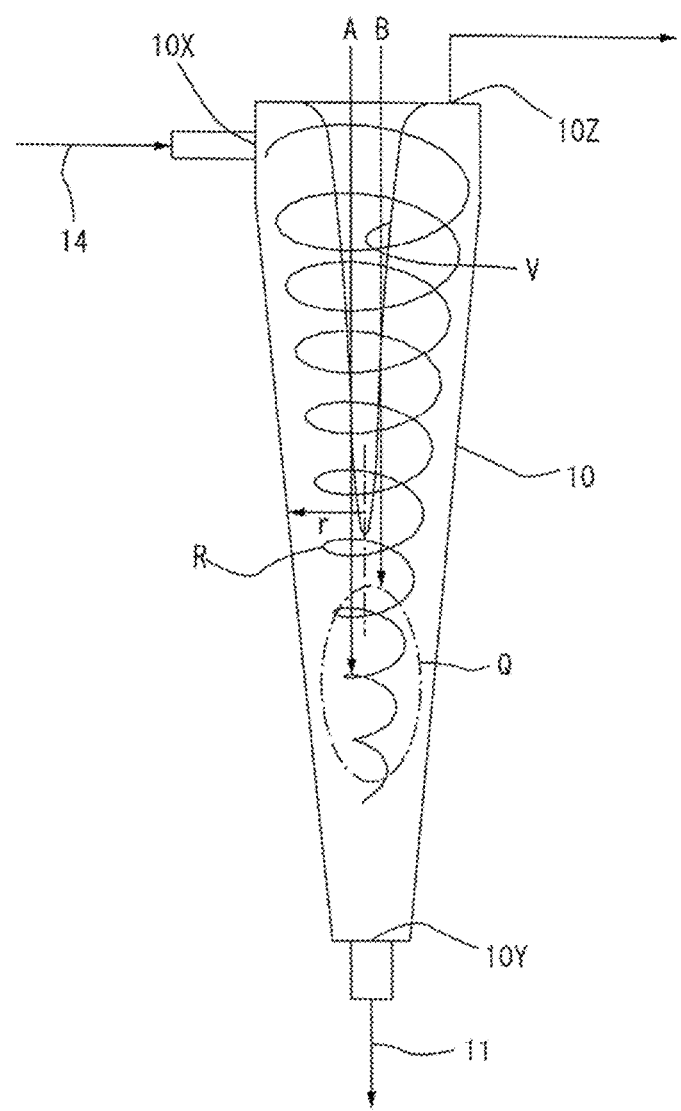
FIG. 4 is an explanatory schematic diagram for generating spiral flow.

As illustrated in the drawing, the inner surface of the processing vessel 10 is tapered from the one end portion to the other end portion in the longitudinal direction. An inflow position including an inflow port 10X of the returned liquid of the circulated liquid is provided at the one end portion of the processing vessel 10 in the longitudinal direction. As illustrated in FIG. 3, the returned liquid is introduced into the processing vessel 10 almost in the tangent direction to an inner peripheral surface of the processing vessel 10, whereby the spiral flow R is generated.

An outflow position including an outflow port 10Y of the liquid extracted from the processing vessel after the contact processing is the other end portion of the processing vessel in the longitudinal direction Further, a final contact processing liquid is discharged from the processing vessel 10 through an overflow port 10Z at the one end portion in the longitudinal direction.

While the liquid flow in the processing vessel 10 is the spiral flow R, a void portion V tends to be formed in an upper center of the flow and a central portion of the swirl. Especially, the flow velocity in an inner peripheral portion in the vicinity of the center of the swirl of the spiral flow R is considerably higher than an average flow velocity, and turbulence of the flow is large.

Accordingly, by injecting from such position, the liquid A to C, as the injection liquid containing metals to be added, into the vessel, the injection liquid is rapidly diffused so as to achieve a uniform reaction.

In this case, it is desirable to provide injection tubes 16A, 16B, . . . through which the liquid A to C are passed so as not to contact mutually until they are ejected from leading tips of injection tubes 16A, 16B, . . . , respectively.

Further, it is desirable to insert a guide tube 17 so as not to effect on these liquids from the spiral flow R.

Although it is sufficient that the injection position of the liquid A to C as the injection liquid containing the inorganic substance to be added is a center-side position with respect to an inner wall surface of the processing vessel 10 in the field of contact processing in the processing vessel 10, the injection position is favorably located within ⅔ of a radius r from the center, more favorably within ½ of the radius r.

The final contact processing liquid is discharged through the overflow port 10Z, and is sent to a storage vessel 20 through a discharge path 19. At appropriate timing, a discharge valve 21 is opened, and an agglomerated particle liquid is discharged from the bottom of the storage vessel so as to be sent to a final producing step by means of a discharge pump 22. The reference numeral 23 is designated as a stirred reactor 23.

Figure 5:
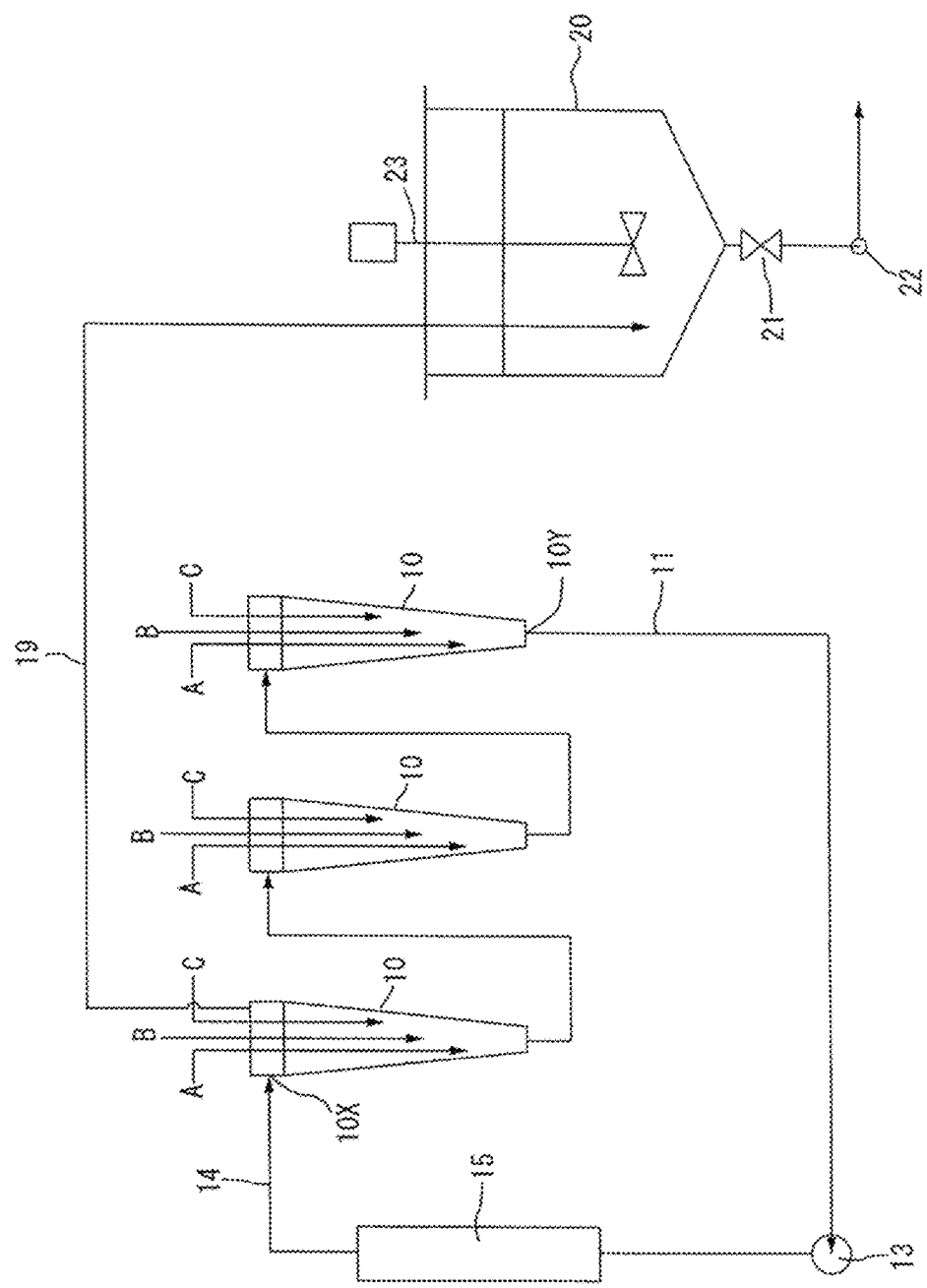
FIG. 5 is a schematic diagram of an example of processing vessels arranged in series.

As exemplarily illustrated in FIG. 5, the processing vessels 10, 10, . . . that provide the field of the contact processing can be arranged in series.

In this case, overflow in the processing vessel 10 in the first stage is sent to the storage vessel 20 while a liquid extracted from the reaction processing vessel 10 in the final stage can be circulated into the processing vessel 10 in the first stage.

Figure 6:
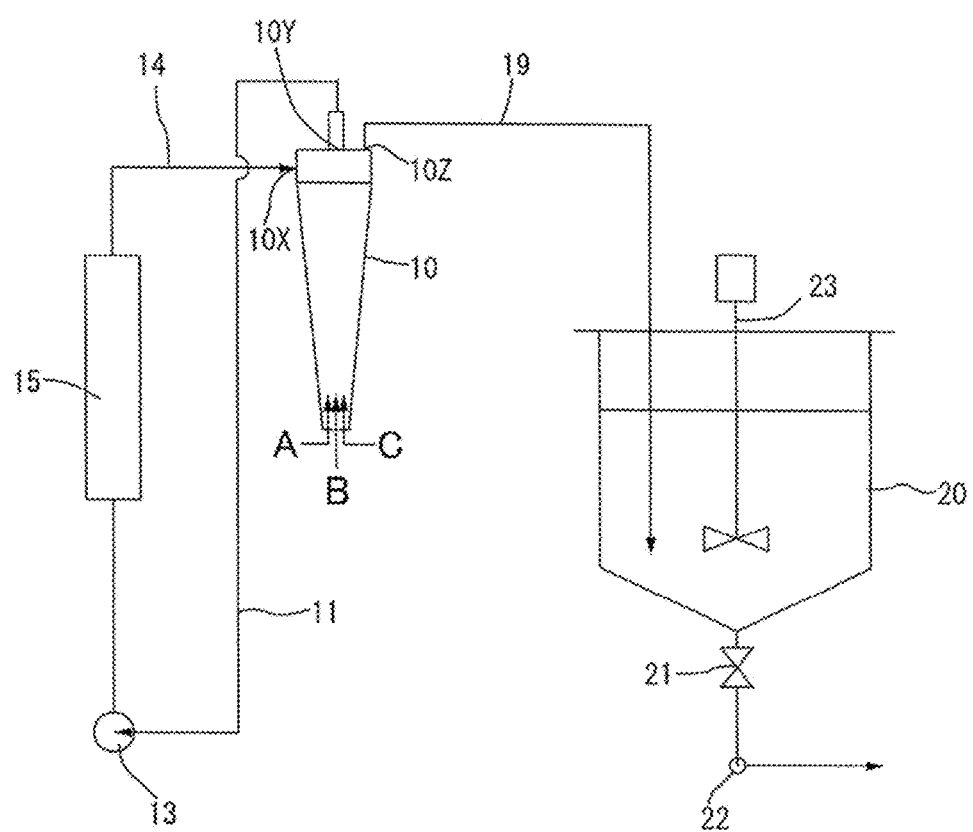
FIG. 6 is a schematic diagram of an example of upward injection.

On the other hand, as exemplarily illustrated in FIG. 6, the injection liquid A to C as the liquid containing metals to be added can be injected toward the field of the contact processing in the processing vessel 10 in the direction from a lower portion to an upper portion. That is, in the example of FIG. 6, the injection liquid containing inorganic substances to be added is injected in the upstream direction of the spiral flow of the liquid toward the field of the contact processing. In this case, a liquid extracted from the upper portion is circulated, and a part of the liquid discharged from the upper portion is sent to the storage vessel 20 through the discharge path 19.

Figure 7:
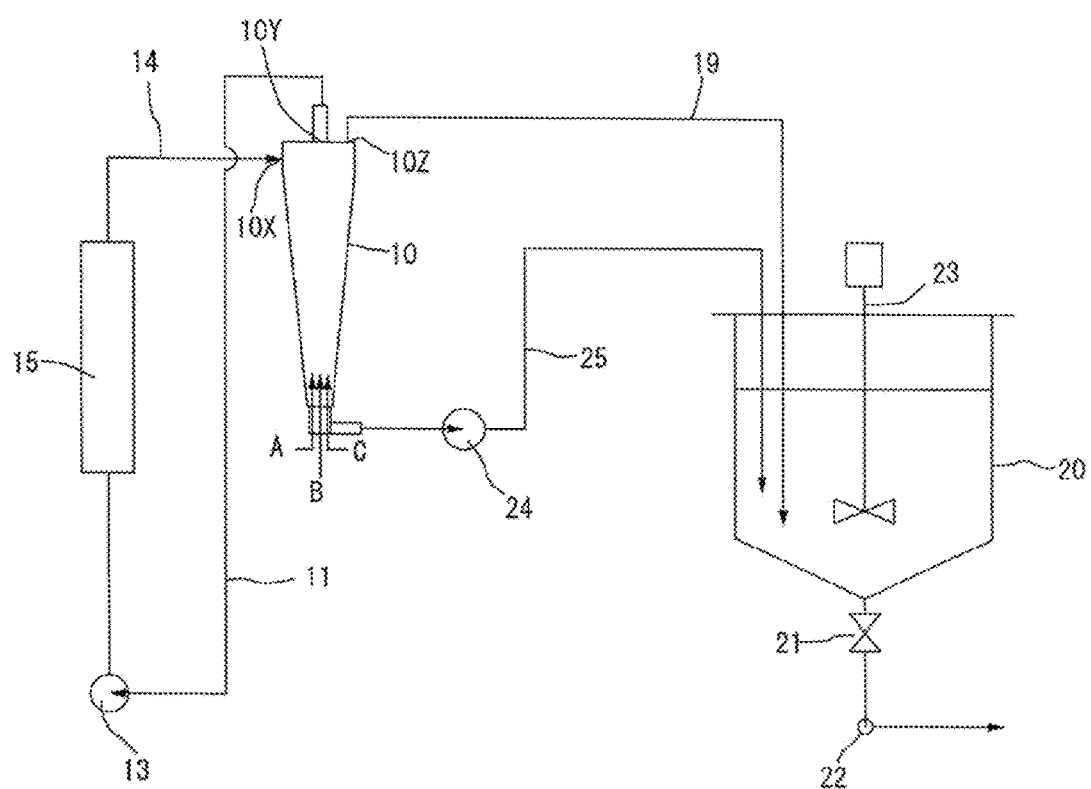
FIG. 7 is a schematic diagram of another example of upward injection.
Figure 8:
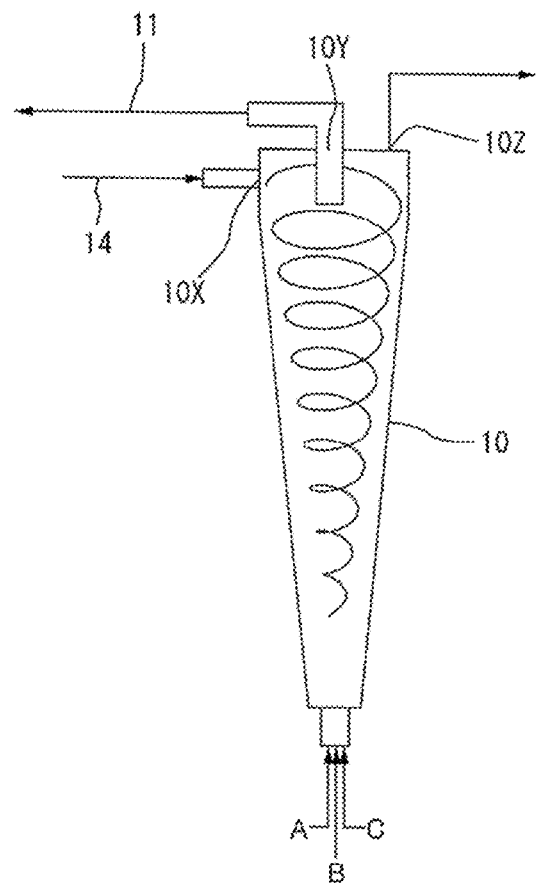
FIG. 8 is an explanatory schematic diagram for generating spiral flow.

Meanwhile, as illustrated in FIG. 7, the liquid may be discharged from the lower portion of the processing vessel 10 by means of the extraction pump 24 so as to be sent to the storage vessel 20 through the discharge path 25.

The inventors originally expected that the injection of the liquid A to C as the injection liquid containing metals to be added from the lower portion to the upper portion exhibits a favorable diffusion reaction, because the liquid A to C are injected so as to be in contact countercurrently with the downward spiral flow. However, adhesion of materials to the inner wall surface of the flow path may be observed in some cases, and thus this embodiment cannot be so suitable.

Figure 9:
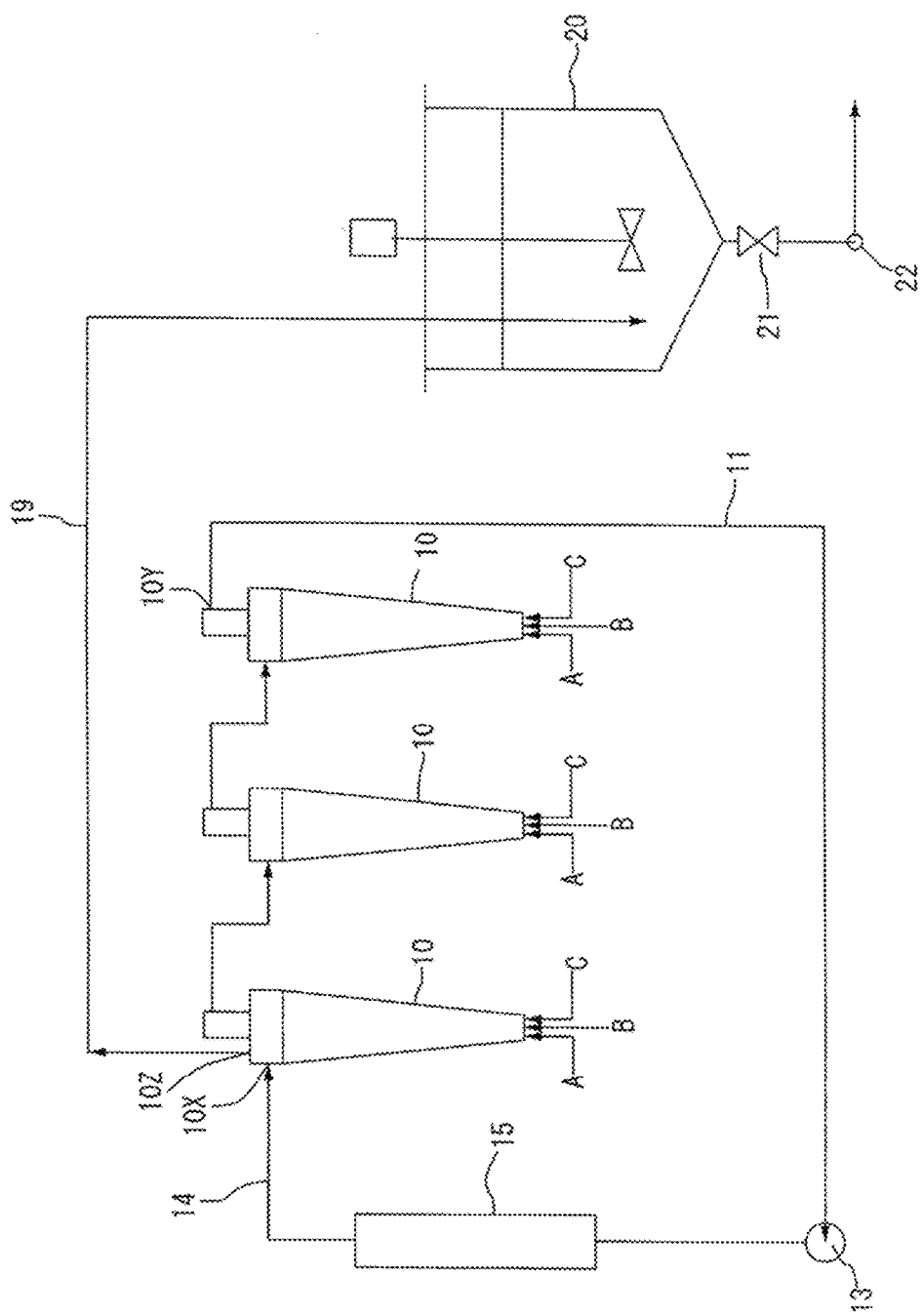
FIG. 9 is a schematic diagram of an example of processing vessels arranged in series.

As exemplarily illustrated in FIG. 9, the processing vessels 10, 10, . . . that provide the field of the contact processing can be arranged in series, even in the embodiment where the liquid A to C containing metals to be added are injected from the lower portion to the upper portion.

Although not shown, the processing vessels 10, 10, . . . that provide the field of the contact processing can be arranged in parallel.

The processing vessel having the inner surface tapered from the one end portion to the other end portion in the longitudinal direction is favorable for generating the spiral flow. However, the processing vessel may have a cylindrical shape with a uniform radius of an inner space.

Figure 10:
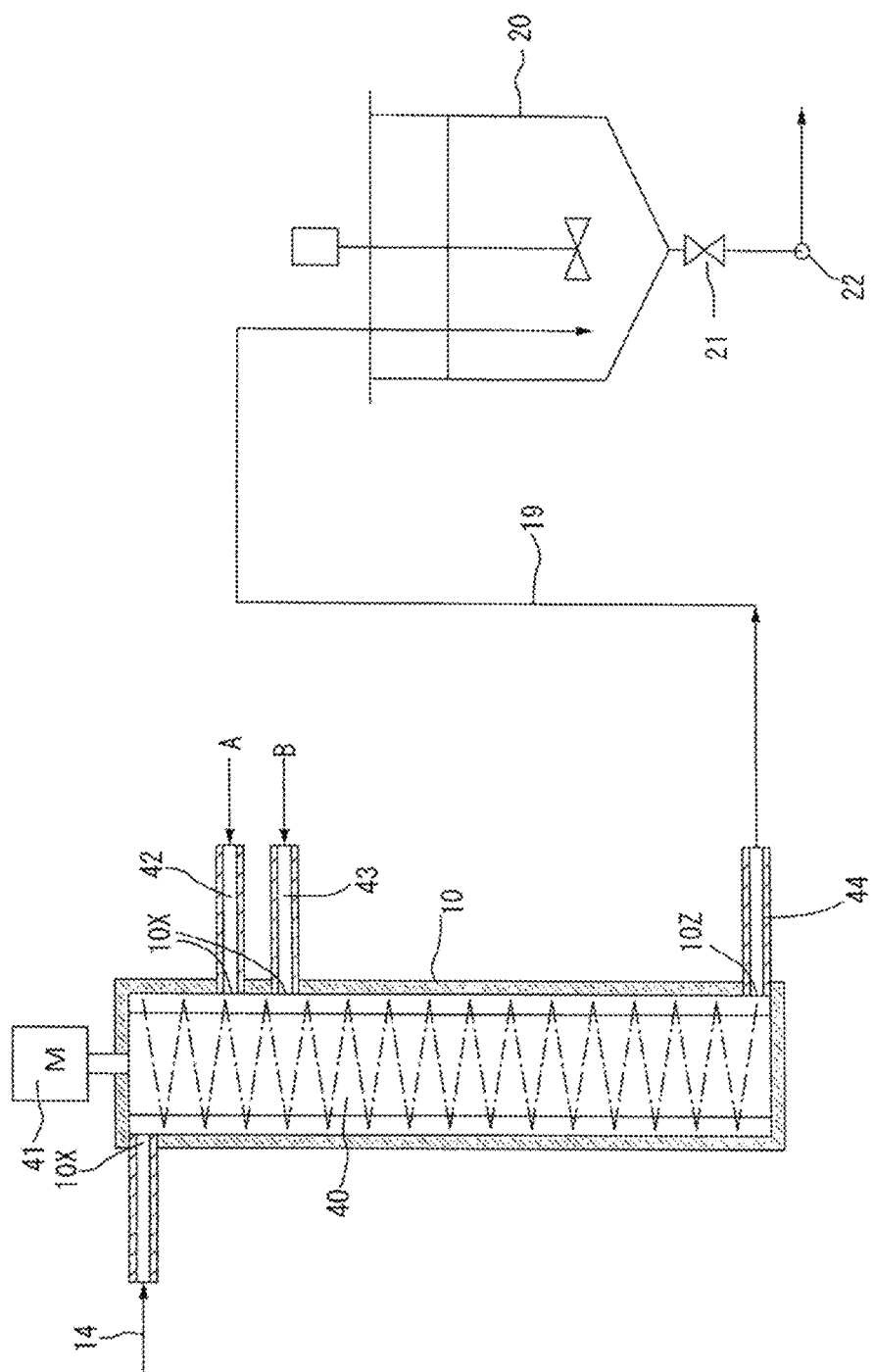
FIG. 10 is a schematic diagram of another example of a processing vessel.

Further, as illustrated in FIG. 10, a rotary barrel 40 is arranged in the processing vessel 10 so as to be rotated by means of a motor 41. The injection liquid A to C containing metals to be added are injected in the tangent direction to the inner wall surface through injection tubes 42 and 43, and the liquid after the contact processing can be discharged through a discharge tube 44 provided in the other end portion.

In this case, the rotary barrel 40 may be rotated as required in order to facilitate the spiral flow.

Figure 11:
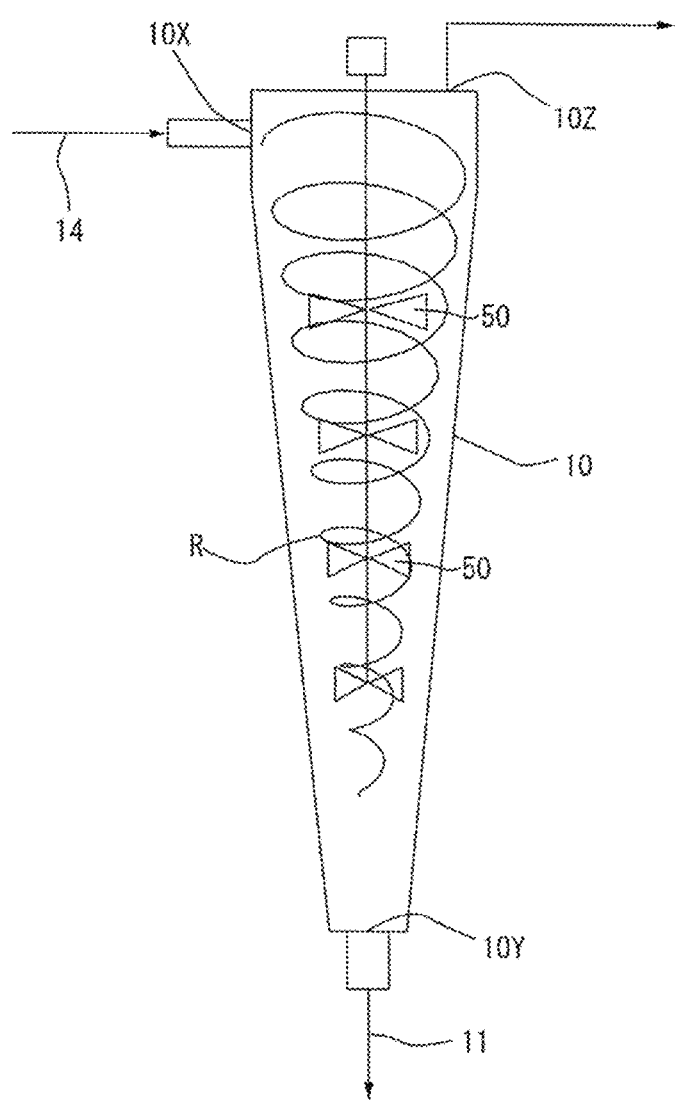
FIG. 11 is a schematic diagram of further another example of a processing vessel.

The spiral flow can be generated by rotating plural stirring blades 50, 50, . . . , which are arranged with spaces therebetween, as illustrated in FIG. 11.

Figure 12:
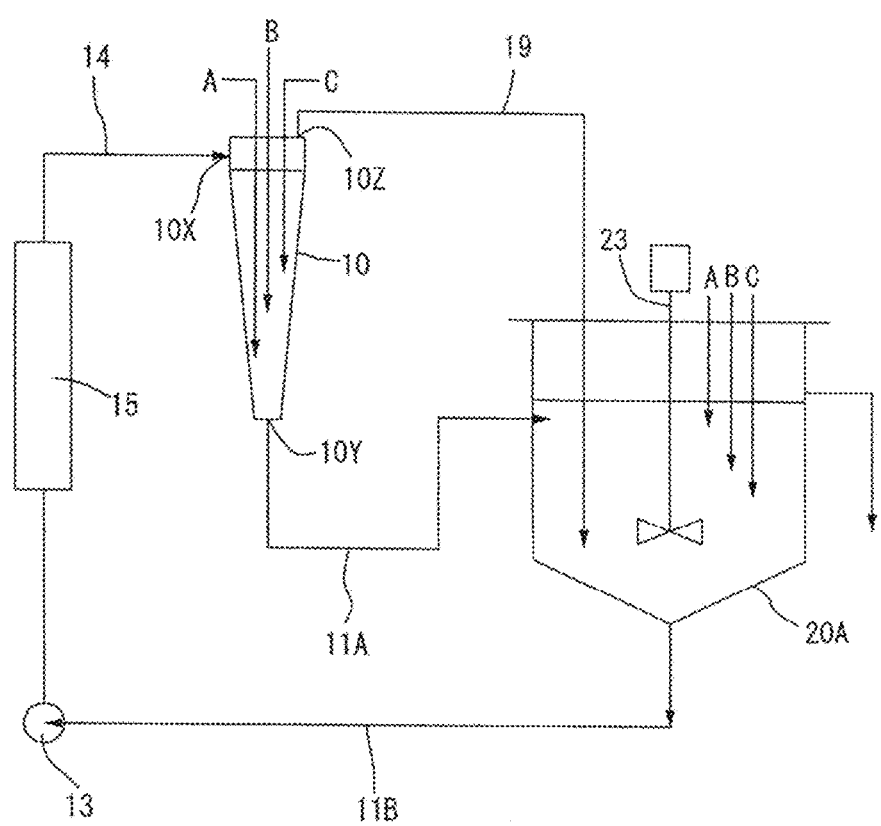
FIG. 12 is a schematic diagram of another embodiment.

Meanwhile, the embodiment of FIG. 12 can be employed. That is, the liquid is circulated for the processing vessel 10 through circulation paths 11A and 11B, and midway in the circulating, an external continuous stirred tank reactor 20A, which has a stirring blade and a different structure from that of the processing vessel 10, is provided. A part of a final contact processing liquid is extracted outside from the processing vessel 10 so as to be sent through the circulation path 11A to the external reactor 20A to which the injection liquid A to C are injected so as to produce a reaction liquid, and the reaction liquid is circulated for the processing vessel 10. In the external tank reactor, the stirring blade can be omitted.

By doing so, the contact processing liquid discharged from the processing vessel 10 is reacted again in the external reactor 20A. Therefore, it is possible to have the long retention time and to decrease particles having small diameters.

Further, in place of the external tank reactor 20A, an external sedimentation separation tank 20B may be used, to which the liquid A to C as the additional liquid is not injected.

In this case where the external sedimentation separation tank 20B is used, it is possible that the separation and sedimentation are performed in the external sedimentation separation tank 20B and it is also possible to return only a group of fine particles in an upper portion of the external tank to the processing vessel 10 through the return path 19R with the return pump 13A. Further, since crystals in the returned liquid are functioned as seed crystals, the particle size distribution in the processing vessel 10 can be adjusted.

Figure 13:
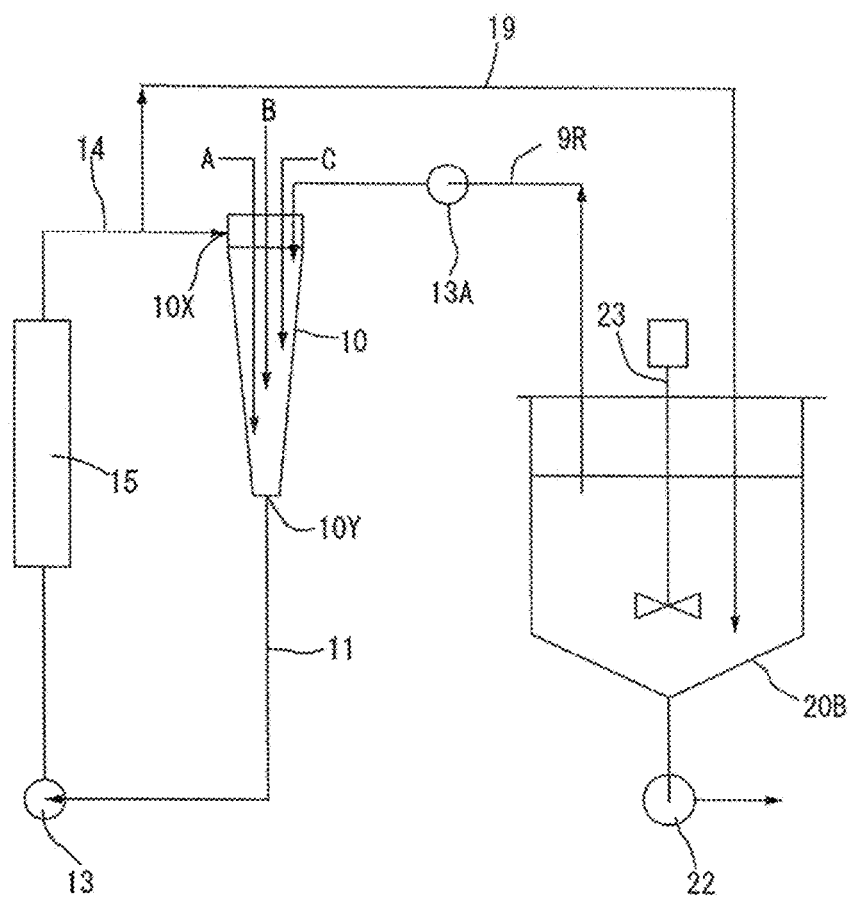
FIG. 13 is a schematic diagram of another embodiment.

In the embodiment of FIG. 13, the tank 20B is the sedimentation separation tank. However, the tank 20B may be used as a buffer tank for adjusting the amount of circulated liquid in relation to the amount of liquid discharged outside by means of the discharge pump 22. In addition, in a similar way as in the embodiment of FIG. 12, the injection liquid A to C or one or two thereof as necessary can be injected into the tank 20B so as to produce a reaction liquid and the reaction liquid can be returned to the processing vessel 10 through the return path 19R.

Figure 14:
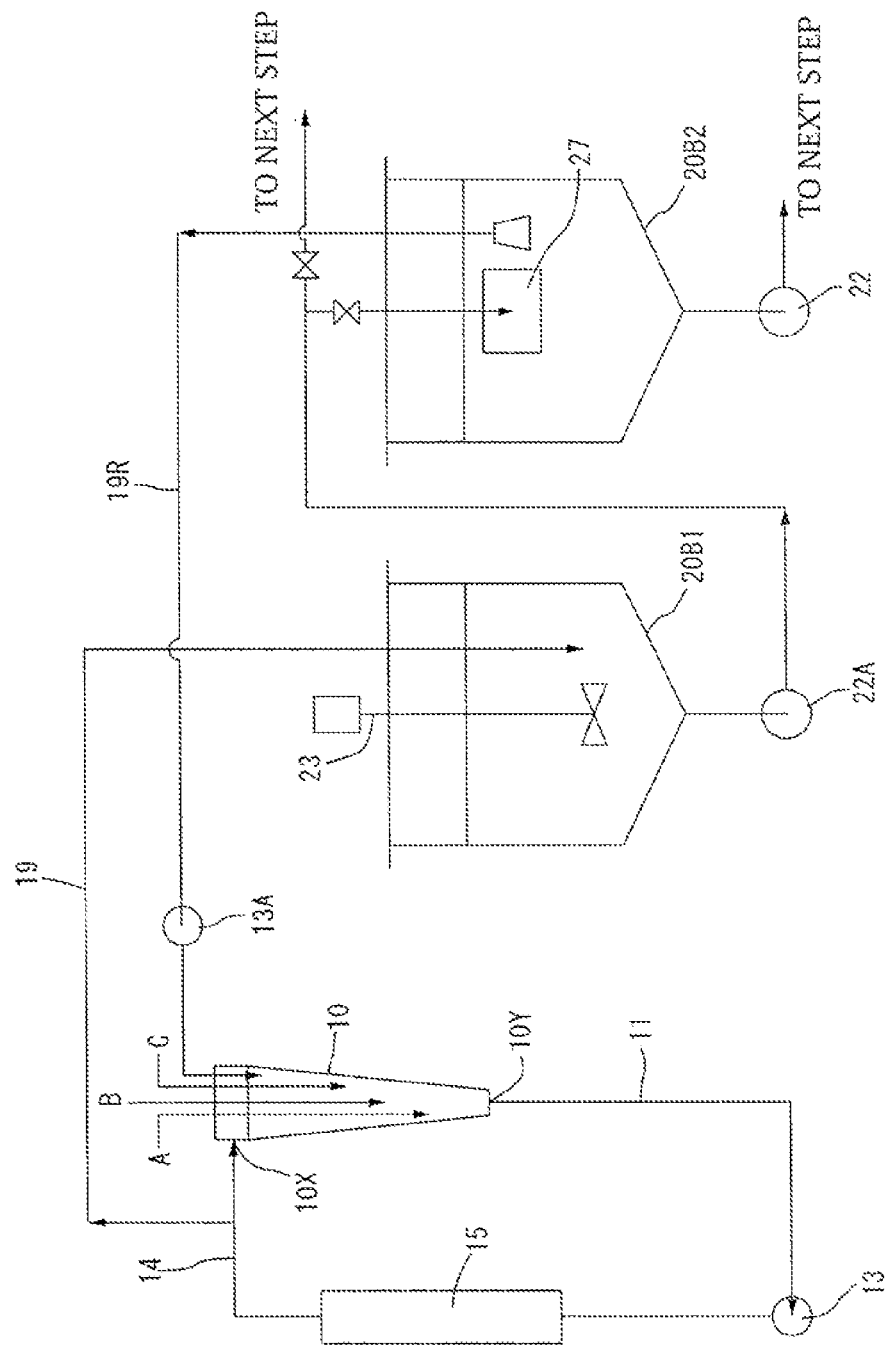
FIG. 14 is a schematic diagram of another embodiment.

Meanwhile, based on the embodiments illustrated in FIGS. 12 and 13, and as illustrated in FIG. 14, two external tanks 20B1, 20B2 are provided and the external tank 20B1 is used as a buffer tank from which, a liquid is sent to, by means of a transfer pump 22A, the external tank 20B2 as a sedimentation separation tank, where, the transferred liquid is injected into a feed well 27 of a thickener, for example, and is settled and separated in the external reactor 20B2. In this embodiment, only a group of fine particles in an upper portion of the external tank 20B2 can be returned to the processing vessel 10 through the return path 19R by means of the return pump 13A. Further, the particle size distribution in the processing vessel 10 can be adjusted by crystals in the returned liquid functioned as seed crystals.

In this embodiment, after the injection liquid A to C are injected into one or both of the external tanks 20B1 and 20B2 so as to produce a reaction liquid, the reaction liquid can be returned to the processing vessel 10 through the return path 19R with the return pump 13A.

FIG. 14 is an example of providing two external reactors 20B1 and 20B2. The external reactor 20B2 of FIG. 14 can be provided at a downstream side of the external processing reactor 20A in the embodiment of FIG. 12. In this case, the overflow of the external processing reactor 20A in the embodiment of FIG. 12 is transferred to the external reactor 20B2 of FIG. 14, for example, and the sedimentation separation processing and the like can be performed in the external reactor 20B2 (this embodiment is not illustrated).

Figure 2:
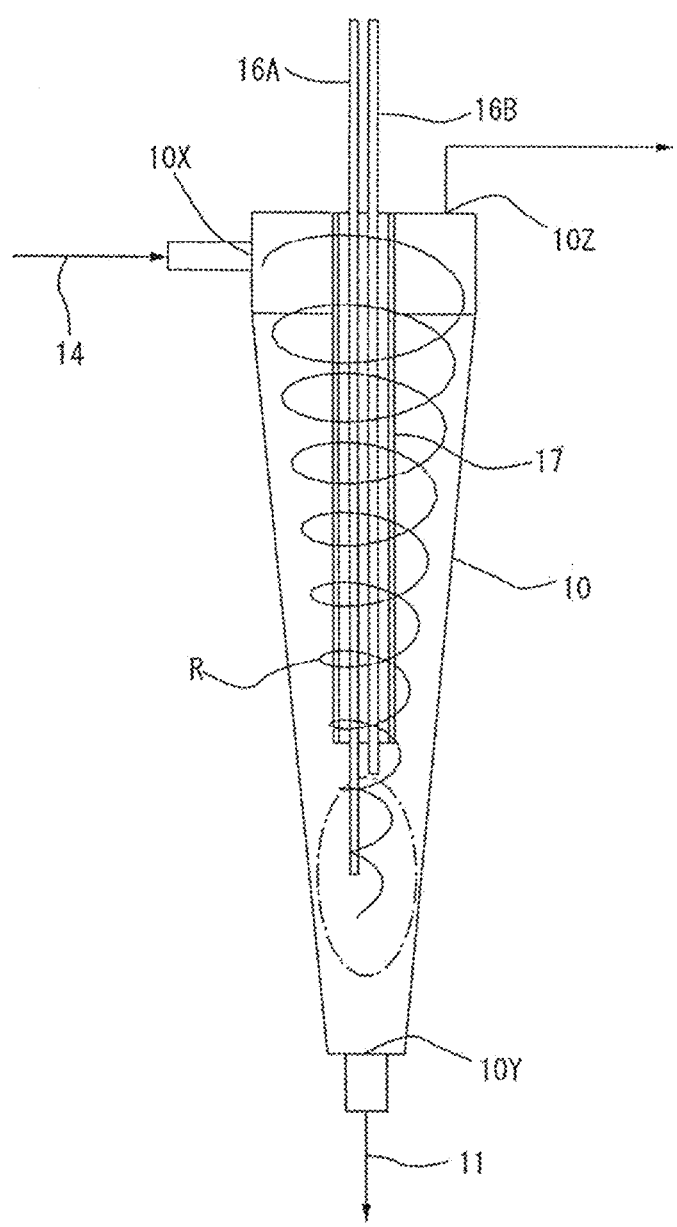
FIG. 2 is a schematic diagram of a first example of a processing vessel.
Figure 15:
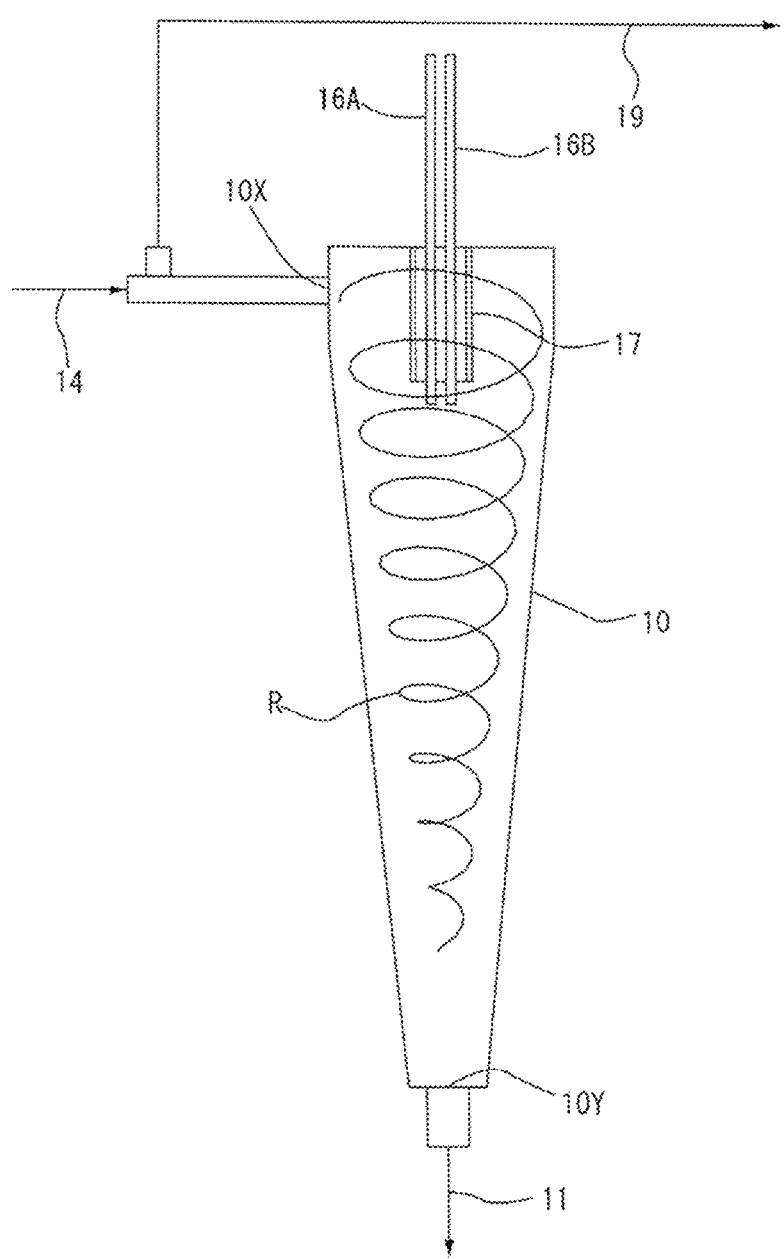
FIG. 15 is a schematic diagram of another embodiment.
Figure 16:
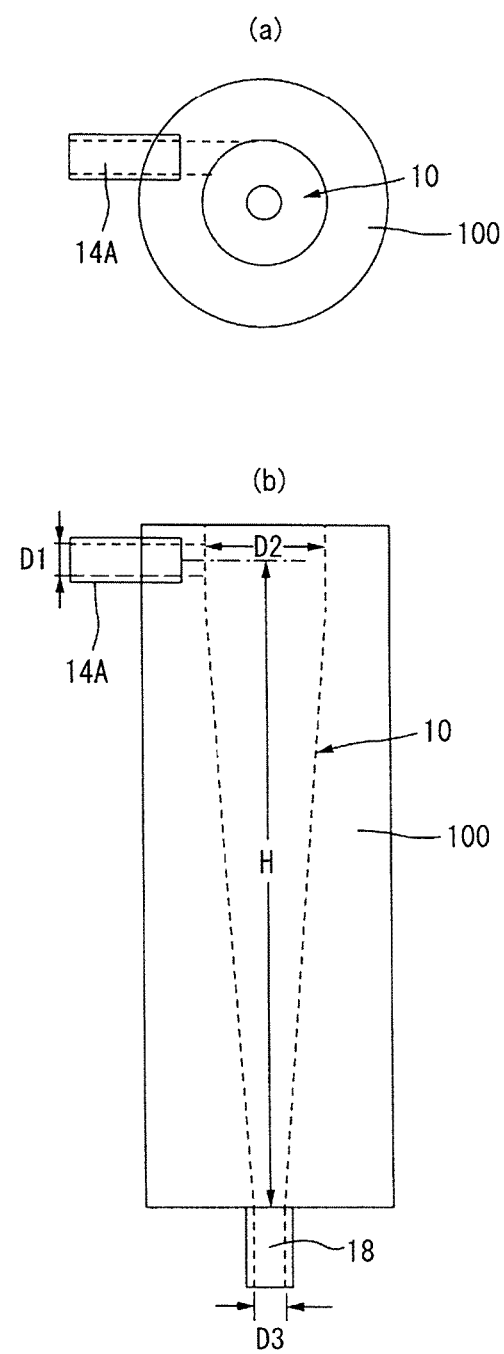
FIGS. 16(a) and 16(b) illustrate a block unit example.
Figure 17:
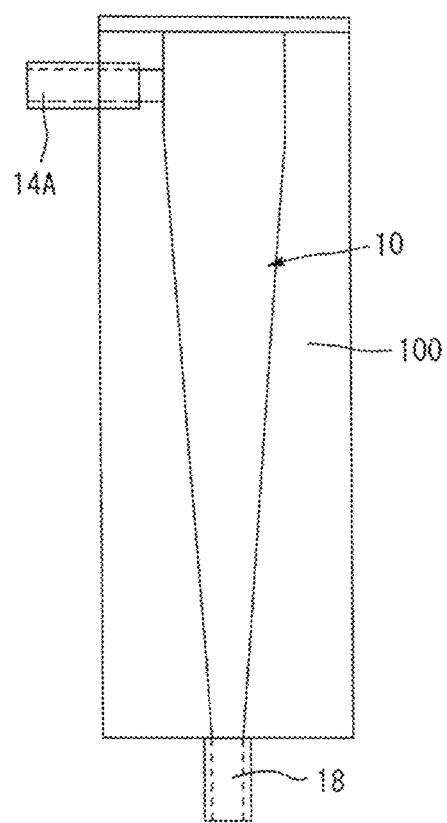
FIG. 17 is a schematic diagram of another block unit example.
Figure 18:
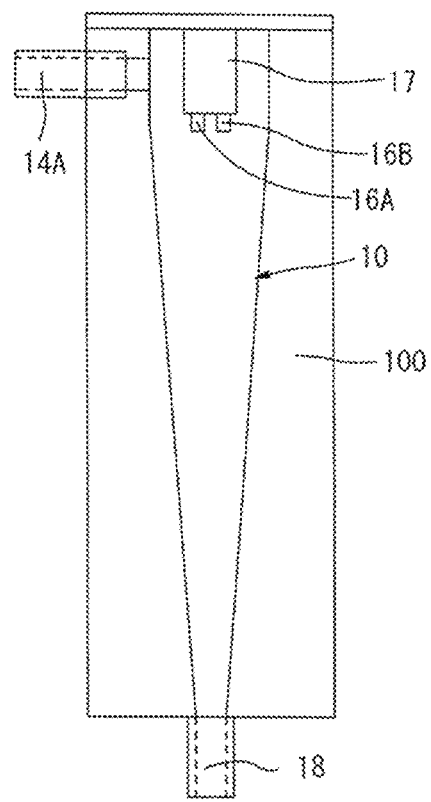
FIG. 18 is a schematic diagram of further another block unit example.
Figure 19:
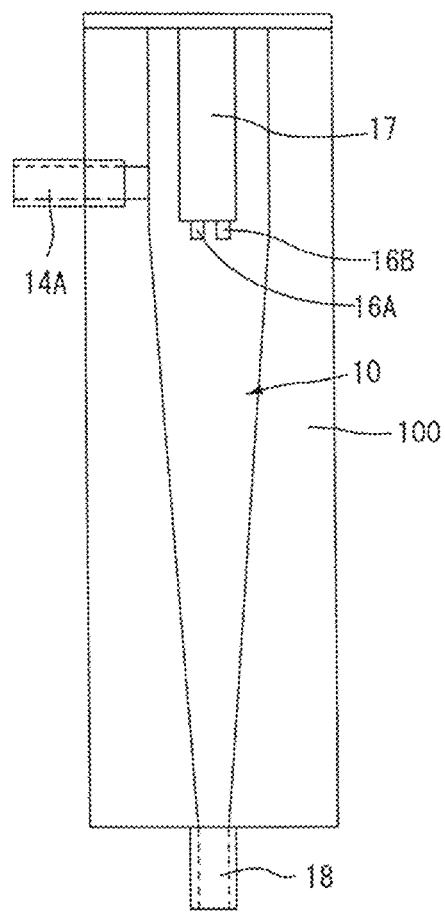
FIG. 19 is a schematic diagram of still another block unit example.

While in the embodiment of FIG. 2, as stated before, the injection liquid is injected at a relatively lower portion of the processing vessel 10. However, as shown in FIG. 15, the guide tube 17 is shortened and the injection tubes 16A, 16B, . . . for the injection liquid A to C may be provided at the upstream side. Alternatively, the guide tube is omitted and the injection tubes may be provided at the end. Further, as shown in FIG. 2, the leading tips of the injection tubes 16A, 16B, . . . may reach at different levels or may reach at the same level.

According to the embodiment illustrated in FIG. 15, the reaction length in the field for generating the spiral flow can be increased so that the adhesion of the materials in the flow path in the downstream side is considerably decreased.

Further, an embodiment is shown in the drawing where the overflow is occurred in a pipe before the liquid is injected.

The metal agglomerated particles obtained by the manufacturing method of the present invention can be used as the cathode active material for the lithium ion battery. Precisely, the cathode active material for the lithium ion battery can be used for manufacturing the lithium ion battery, and finally the battery can be also obtained by the present invention.

According to the present invention, the metal agglomerated particles having the small and uniform particle diameter and the substantially globular shape can be obtained. Hence, in utilizing such particles as the cathode active material for the lithium ion battery, it is noted that the characteristics of the cathode are improved.

The device according to the present invention may employ appropriate dimension relationship according to materials for processing, liquids and the like. However, from a view point of providing a device which is small but which can exhibits a sufficient processing amount and a uniform contact processing property, it is desirable that a ratio of the injection port diameter D1 of the main flow that becomes the spiral flow to a diameter D2 of the field of the contact processing for generating the spiral flow is expressed by D2/D1=2.5 to 10. If this ratio is small, generation of the spiral flow is insufficient. On the other hand, if the ratio is excessively large, the speed becomes slow, and the spiral flow becomes unstable.

Further, to stably generate the spiral flow, it is desirable that a ratio of a port diameter D3 of the extraction portion to a diameter D2 of the field of the contact processing for generating the spiral flow is expressed by D2/D3=0.5 to 10

Still further, to ensure a contact reaction time, it is desirable that a ratio of a length H in the flow path direction to a diameter D2 of the field of the contact processing for generating the spiral flow is expressed by H/D2=1 to 10.

Since the device of the present invention has high contact efficiency, it is enough to use a small processing vessel (with a small inner volume). Therefore, as illustrated in FIGS. 17 to 22, the processing vessel (processing unit) can be provided by forming a space in a main body block 100 (or 101) by means of cutting work or the like.

A chemicals injection unit is favorably a detachable type, which can be easily replaced.

The material of the main body block 100 (or 101) may be not only a SUS material, but also a plastic material such as polyester, acrylic, polypropylene, polyethylene, or polycarbonate. More favorably, a transparent or semitransparent material may be used.

In this case, the flow paths 14A and 18, and the injecting unit are favorably a detachable type, which can be easily replaced.

Whether the guide tube 17 is provided or not, and the installation positions and the length of the guide tube 17 and of the injection tubes 16A, 16B, . . . can be appropriately selected.

Figure 20:
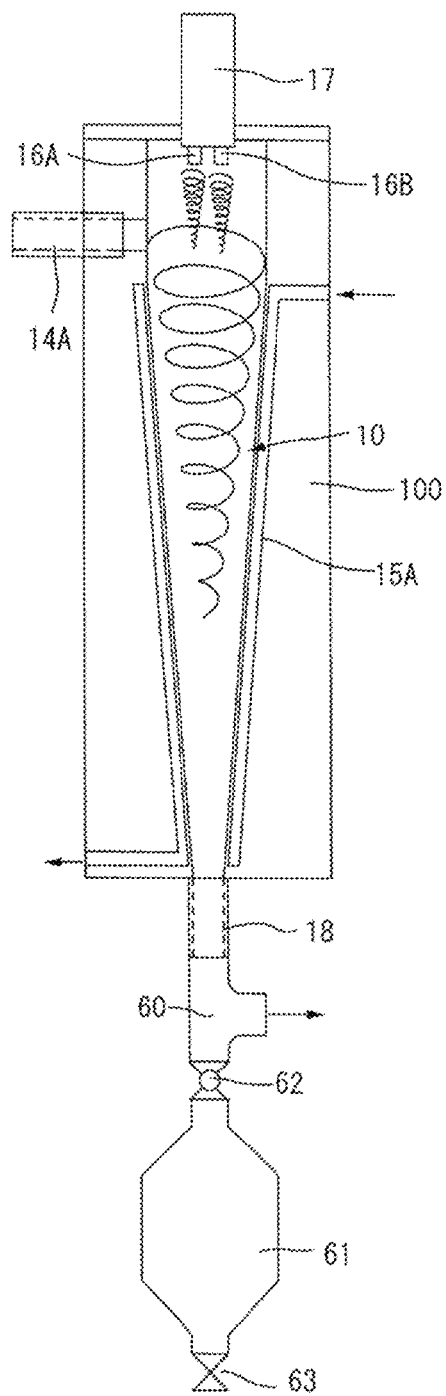
FIG. 20 is a schematic diagram of another embodiment.

FIG. 20 illustrates an embodiment where a circulation path 15A is provided for circulating a heating medium therein and for controlling the temperature in the processing vessel 10.

Further, an example of injecting the injection liquid through the injection tubes 16A and 16B with the spiral flow is also illustrated.

If discharge of the processed liquid is not smooth, generation of the spiral flow in the processing vessel 10 eventually becomes unstable, and clogging may be caused.

Therefore, it is important not to form retention in the discharge path using an elbow joint 60, and the like.

In maintenance at appropriate timing, when the liquid is discharged outside the system, it is desirable to store the liquid in a temporary vessel 61, and block before and after the temporary vessel 61 with valves 62 and 63.

Figure 21:
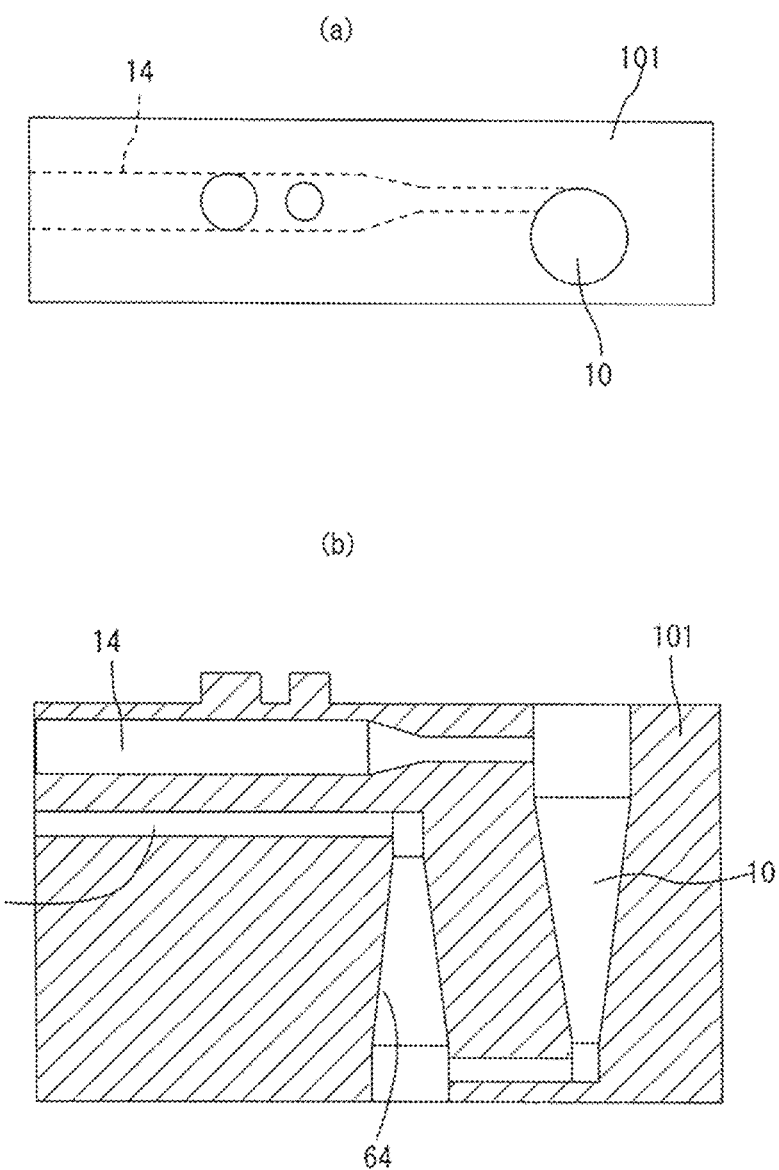
FIGS. 21(a) and 21(b) are schematic diagrams of an embodiment of a processing unit.

As illustrated in FIGS. 21(*a*), 21(*b*) and 22, a space is formed inside the main body block 101, and the processing vessel 10, the extraction path 11 through which the processed liquid is extracted, and the return path 14 that returns the processed liquid can be respectively formed therein.

A space 64 can be formed so as to a similar shape to the temporary vessel illustrated in FIG. 20.

Figure 22:
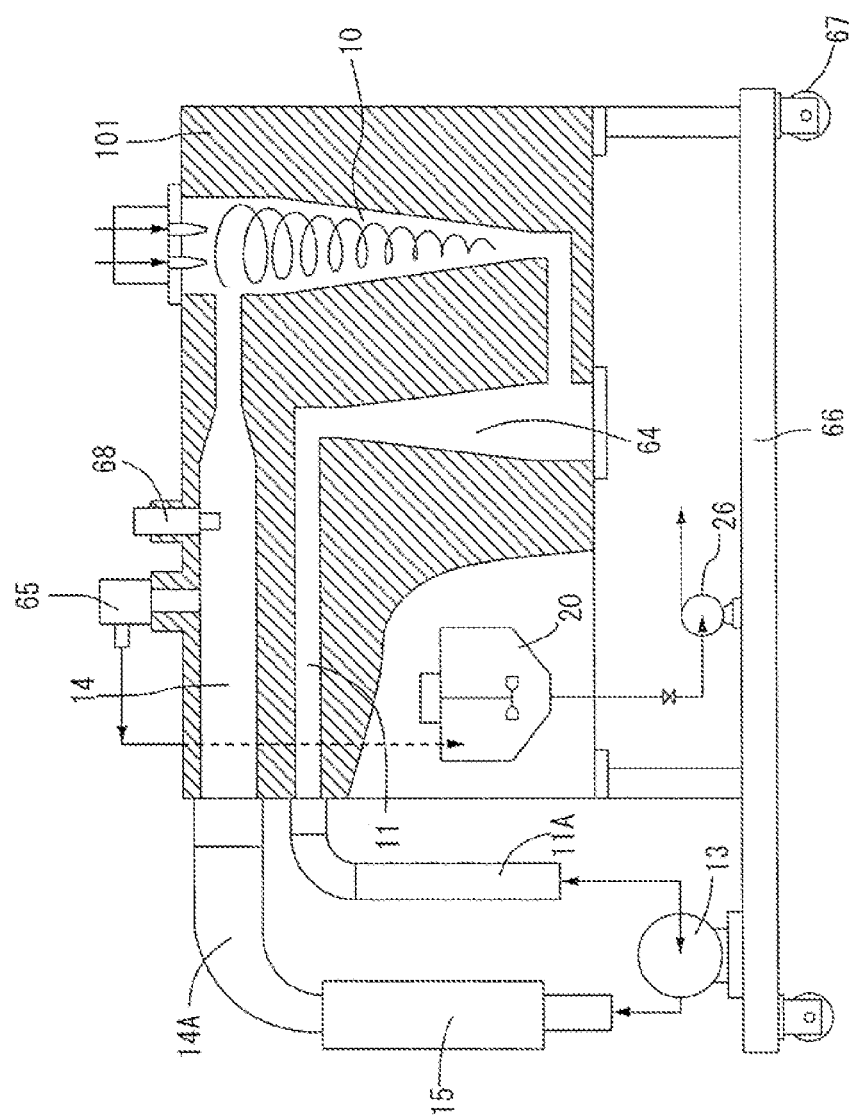
FIG. 22 is a schematic diagram of an example of a unitary device.

The block unit is combined with, for example, as illustrated in FIG. 22, the circulation path 11A, the circulation pump 13, the return path 14A, a heater/cooler 15, an overflow unit 65, the storage vessel 20, the transfer pump 26, and the like, and can be formed into a unitary device on a base 66 as a processing unit, and can be made movable by means of a caster 67, as needed. A measuring sensor 68 measures a temperature, pH, and the like.

Plural or large number of the block units and the processing units can be arranged in a direction penetrating the surface of paper, for example for a large processing amount.

The present invention, by which mass transfer and chemical reaction can be performed efficiently in a reaction field where the rate is limited by the mass transfer rather than by the reaction, can be applied regardless of an inorganic reaction or an organic reaction.

Further, the device of the present invention can be applied to liquid-liquid extraction and can be used as a mixing device of a liquid and a liquid, such as emulsion of water and oil.

Further, the device of the present invention, with which the application can be developed to a process other than the liquid-liquid reaction, such as a gas-liquid reaction, a reaction to a solid particle surface (coating), and the like.

To achieve the spiral flow with small power, liquid viscosity is desirably 1000 cP or less, more desirably 100 cP or less.

EXAMPLES

Next, by way of examples and comparative examples, the effects of the present invention will be clearly shown.

Example 1

Example of Nickel Manganese Cobalt Hydroxide

As the reactant A, 1.6 M liquid obtained such that nickel sulfate, manganese sulfate, and cobalt sulfate are mixed at a ratio of 1:1:1 was used. As the reactant B, 25% sodium hydroxide was used, and as the reactant C, 25% ammonia water was used. To advance predetermined reaction, it is common that solvent adjustment is performed to the reactant A by addition of ammonium sulfate, hydrogen peroxide, ethanol, glycerin, or the like and in this example, 0.1 M of ammonium sulfate was added.

The reactant A, the reactant B and the reactant C were injected into the processing vessel 10 in the embodiment of FIGS. 1 to 4.

A start mother liquor prepared such that 40 g of ammonia water is added to 2 kg of ion exchange water was used.

The circulation pump was operated at 20 L/min, about 120 g/min of the reactant A, about 40 g/min of the reactant B, and about 3 g/min of the reactant C were injected. Further, 50 ml/min of an N2 gas was injected.

Figure 24:
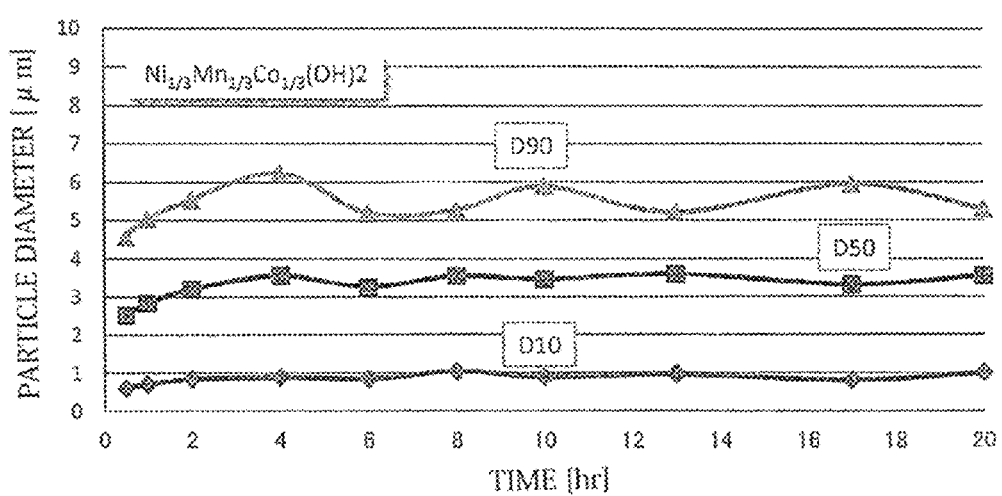
FIG. 24 is a graph showing the change of particle diameters of Example 1.

Variation results with time of particle diameters are shown in the graph of FIG. 24 and SEM photographs of the particles taken when the operation had been performed for 20 hours are shown in FIGS. 25(*a*), 25(*b*) and 25(*c*).

<Discussion>

The particle diameters are small, and are stable over time.

Further, there was no adhesion of the materials to the inner wall surface of the circulation path even after the operation had been performed for 20 hours (a transparent plastic pipe was used for the circulation path, and presence of the adhesion of the materials was visually determined from the outside).

Comparative Example 1

Example of Nickel Manganese Cobalt Hydroxide

Figure 23:
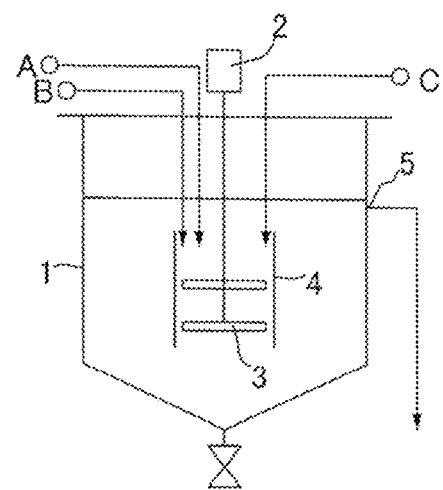
FIG. 23 is a schematic diagram of a conventional example.

Nickel manganese cobalt hydroxide particles were obtained in a typical stirred reactor with a draft tube as illustrated in FIG. 23.

As the reactant A, 1.6 M liquid obtained such that nickel sulfate, manganese sulfate, and cobalt sulfate were mixed at a ratio of 1:1:1 was used.

As the reactant B, 25% sodium hydroxide was used, and as the reactant C, 25% ammonia water was used.

The stirring machine was operated with a speed of rotation of 2000 rpm. About 10 g/min of the reactant A, about 4 g/min of the reactant B, and about 0.6 g/min of the reactant C were injected around the rotor blade of the stirred reactor, and 100 ml/min of N2 gas was injected into a lower portion of the stirred reactor. The device system was operated with about 4 L of the capacity.

Figure 26:
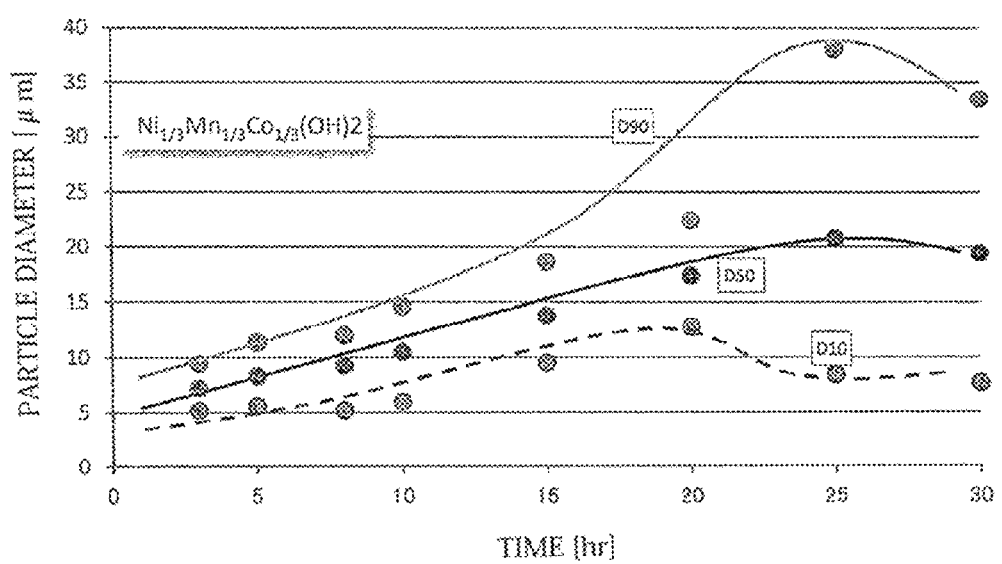
FIG. 26 is a graph showing the change of particle diameters of Comparative Example 1.

Variation results of the particle diameters obtained from the operation for 30 hours are shown in the graph of FIG. 26, and SEM photographs of the particles taken when the operation had been performed for 15 hours are illustrated in FIGS. 27(*a*), 27(*b*) and 27(*c*).

According to these results, in Comparative Example 1, the particle diameters are large, and are unstable over time.

Example 2

Example of Manufacturing Emulsion Fuel

A liquid prepared with 1 L of water, 1 L of a light oil and an emulsifier, which was injected to have 3.4% of 1 L of water, were circulated in the present device at a flow rate of 10 L/min for one minute, then water, the light oil, and the emulsifier were added to the reaction unit at 200 mL/min, 250 mL/min, and 34 g/min, respectively, and were discharged by overflow.

An O/W type emulsion fuel was obtained, and kept the emulsified state after the lapse of one week.

When a static mixer was used in the reaction unit, oil-water separation occurred after the lapse of one day.

INDUSTRIAL APPLICABILITY

The present invention can be applied to various uses, in addition to a cathode active material for lithium ion battery. A list of such examples is as follows:
1) Manufacturing of emulsion fuel
2) Manufacturing small particles, Growing crystals from nanoparticles, and the like
3) Manufacturing diazo compound 4) Catalyst reaction
5) Example of other reaction processing with micro reactor
   a) Gas-liquid interface reaction
      Fluorination reaction with fluorine gas
      Carbonylation reaction with carbon monoxide gas
   b) Liquid-liquid interface reaction
      Nitration reaction (organic phase/water phase)
      Reduction of Ester
      Diazo coupling
   c) Solid-liquid interface reaction
      Reaction using solid supported catalyst
   d) Gas-liquid-solid interface reaction
      Hydrogenation reaction

REFERENCE SIGNS LIST

10 Processing vessel
10X Inflow port
10Y Outflow port
10Z Overflow port
11 and 14 Circulation path
16A and 16B Injection tube
17 Guide tube
20 Storage vessel
40 Rotary barrel
A, B, and C Injection liquid

The invention claimed is:

1. A continuous reaction processing device for inorganic particles including: a reactor having a first end portion, a second end portion, and an inner surface; an injecting unit for injecting a reaction liquid containing an inorganic substance into the reactor; and a circulating unit for continuously introducing a contact processing liquid discharged from the second end portion of the reactor into a circulation flow path and returning at least a part of the contact processing liquid to become a returned processing liquid flowing into the circulation flow path to the first end portion of the reactor;
   wherein the circulating unit causes the returned processing liquid to flow along the inner surface of the reactor to generate a spiral flow inside the reactor;
   wherein the injecting unit injects the reaction liquid having a injection direction from the first end portion to the second end portion at a position closer to the second end portion than to an inflow position for the returned processing liquid into the reactor, and closer to a central axis of the reactor than to the inner surface of the reactor;
   wherein the injected reaction liquid comes into contact with the spiral flow of the contact processing liquid inside the reactor, and the contact processing liquid is discharged from the second end portion of the reactor; and
   wherein the injecting unit fails to inject gas into the reactor.

2. The continuous reaction processing device for inorganic particles according to claim 1, wherein the inner surface of the reactor is tapered from the first end portion to the second end portion and the inflow position for the returned processing liquid is the first end portion of the reactor in a longitudinal direction.

3. The continuous reaction processing device for inorganic particles according to claim 1, comprising the reactor through which the contact processing liquid is circulated, wherein
   midway in the circulating, an external reactor is provided, which has a stirring blade and a different structure from that of the reactor,
   a part of the contact processing liquid is extracted outside from the reactor so as to be sent to the external reactor where the contact processing liquid is processed, and the contact processing liquid is returned to the reactor.

4. The continuous reaction processing device for inorganic particles according to claim 1, comprising the reactor through which the contact processing liquid is circulated, wherein
   midway in the circulating, two external tanks are provided in series,
   a downstream-side external tank is an external sedimentation separation tank, to which the reaction liquid is not injected, and in which sedimentation and separation are performed, and
   only a group of fine particles in an upper portion of the external sedimentation separation tank is returned to the reactor.

5. The continuous reaction processing device for inorganic particles according to claim 1, comprising the reactor through which the contact processing liquid is circulated, wherein
   midway in the circulating, an external sedimentation separation tank, to which the reaction liquid is not injected, and in which solid-liquid separation, separation of particles according to size or gas separation is performed, and
   only a group of fine particles in an upper portion of the external sedimentation separation tank or only a gas separated liquid is returned to the reactor.

6. The continuous reaction processing device for inorganic particles according to claim 1, the device comprising a main body block, the main body block having a space formed therein, and the reactor being formed in the space.

7. The continuous reaction processing for inorganic particles device according to claim 1, the device comprising a main body block, the main body block having a space formed therein, and plural reactors being formed in parallel in the space.

8. The continuous reaction processing device for inorganic particles according to claim 1, wherein a space is formed in a main body block and the reactor, an extraction path through which the contact processing liquid is extracted, and a return path through which the contact processing liquid is returned, are respectively formed in the space.

9. The continuous reaction processing device for inorganic particles according to claim 6, wherein the main body block is made of a transparent or semitransparent material.

10. The continuous reaction processing device for inorganic particles according to claim 1, wherein the reactor, the injecting unit, and the circulating unit form a unitary device, and a plurality of these unitary devices are arranged mutually.

11. The continuous reaction processing device for inorganic particles according to claim 1, wherein the injecting unit is configured to inject the reaction liquid into the reactor through a check valve.

12. The continuous reaction processing device for inorganic particles according to claim 1, wherein midway in a circulating path, a heating unit or cooling unit for the contact processing liquid is included.

13. The continuous reaction processing device for inorganic particles according to claim 1, wherein the reaction liquid is injected via a plurality of injection tubes arranged in parallel with each other from the first end portion to the second end portion.

* * * * *